United States Patent
Lockett et al.

(10) Patent No.: US 12,437,240 B2
(45) Date of Patent: *Oct. 7, 2025

(54) SYSTEM AND METHOD FOR ARTIFICIAL INTELLIGENCE DRIVEN DOCUMENT ANALYSIS, INCLUDING AUTOMATED REUSE OF PREDICTIVE CODING RULES BASED ON MANAGEMENT AND CURATION OF DATASETS OR MODELS

(71) Applicant: CS Disco, Inc., Austin, TX (US)

(72) Inventors: Alan Justin Lockett, Georgetown, TX (US); Verlyn Michael Fischer, Cedar Park, TX (US); Richard Alan Vestal, Jonestown, TX (US); Jesse Abraham Ramos, Austin, TX (US); Robert Duane Harrington, Austin, TX (US); Brian Daniel Luskey, Austin, TX (US)

(73) Assignee: CS Disco, Inc., Austin, TX (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/859,886

(22) Filed: Jul. 7, 2022

(65) Prior Publication Data
US 2023/0004873 A1    Jan. 5, 2023

Related U.S. Application Data

(63) Continuation of application No. 16/881,274, filed on May 22, 2020, now Pat. No. 11,416,685.

(60) Provisional application No. 62/968,659, filed on Jan. 31, 2020.

(51) Int. Cl.
*G06F 17/00* (2019.01)
*G06F 40/30* (2020.01)
*G06N 5/04* (2023.01)
*G06N 20/20* (2019.01)

(52) U.S. Cl.
CPC ............. *G06N 20/20* (2019.01); *G06F 40/30* (2020.01); *G06N 5/04* (2013.01)

(58) Field of Classification Search
CPC .......... G06N 20/20; G06N 5/04; G06F 40/30
USPC .......................................................... 704/9
See application file for complete search history.

(56) References Cited

U.S. PATENT DOCUMENTS 10,108,902 B1 * 10/2018 Lockett ................. G06F 40/169
2018/0197531 A1 * 7/2018 Baughman ............ G06F 40/247

* cited by examiner

Primary Examiner — Paul C McCord
(74) Attorney, Agent, or Firm — Sprinkle IP Law Group

(57) ABSTRACT

Artificial intelligence based document analysis systems and methods are disclosed. Embodiments of document analysis systems may allow the reuse of coded datasets defined in association with a particular code by allowing these datasets to be bundled to define a dataset for another code, where that code may be associated with a target corpus of documents. A model can then be trained based on that dataset and used to provide predictive scores for the documents of the target corpora with respect to the code. Furthermore, this code can be applied not just to the target corpus of documents, but additionally can be applied against any other corpora.

21 Claims, 13 Drawing Sheets

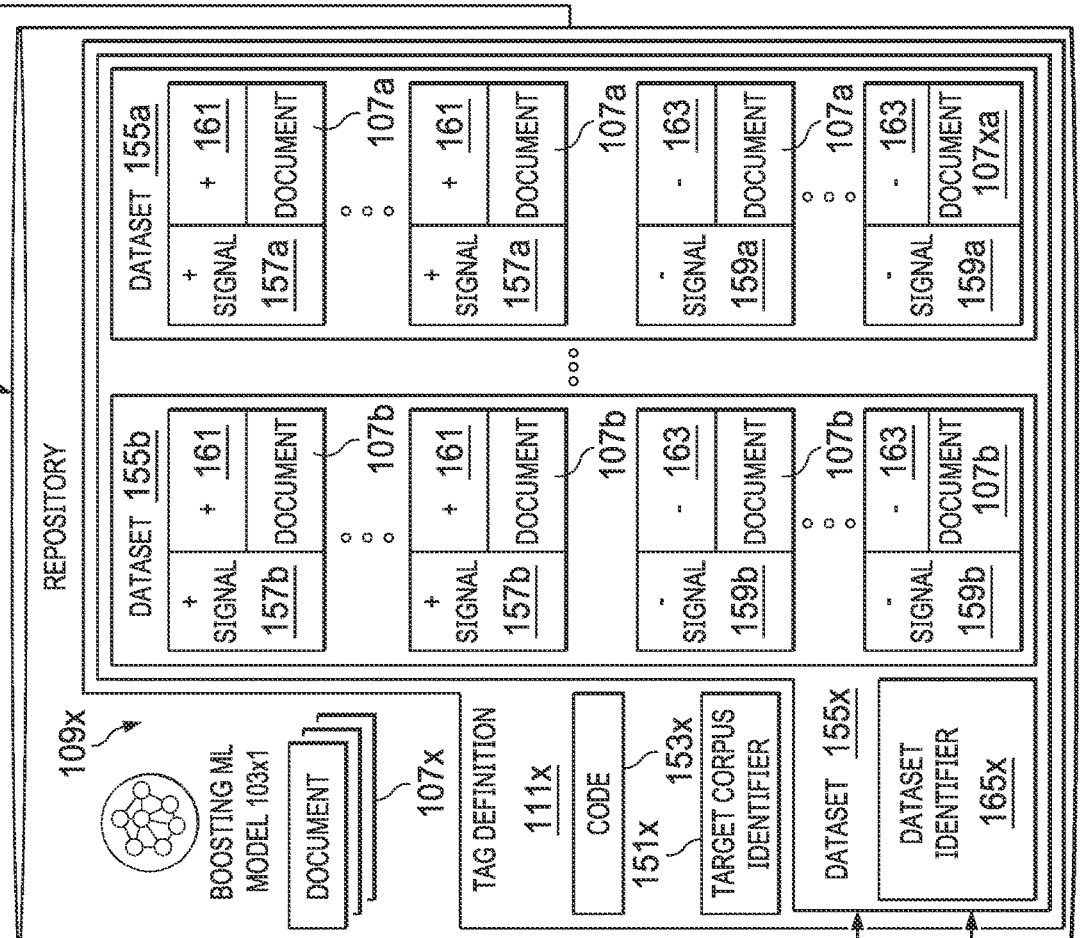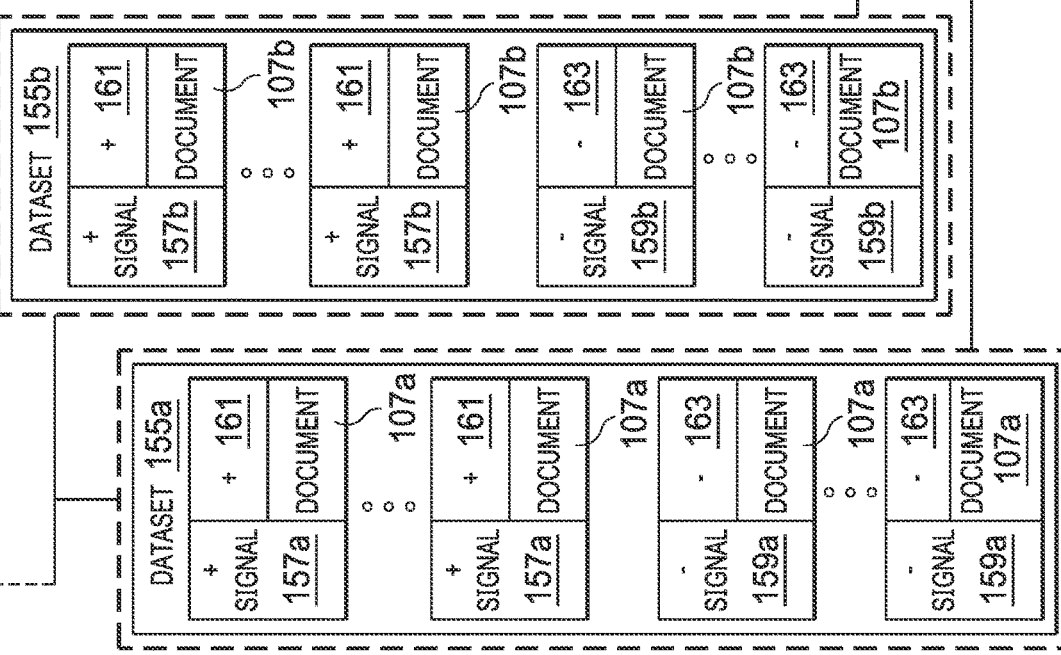

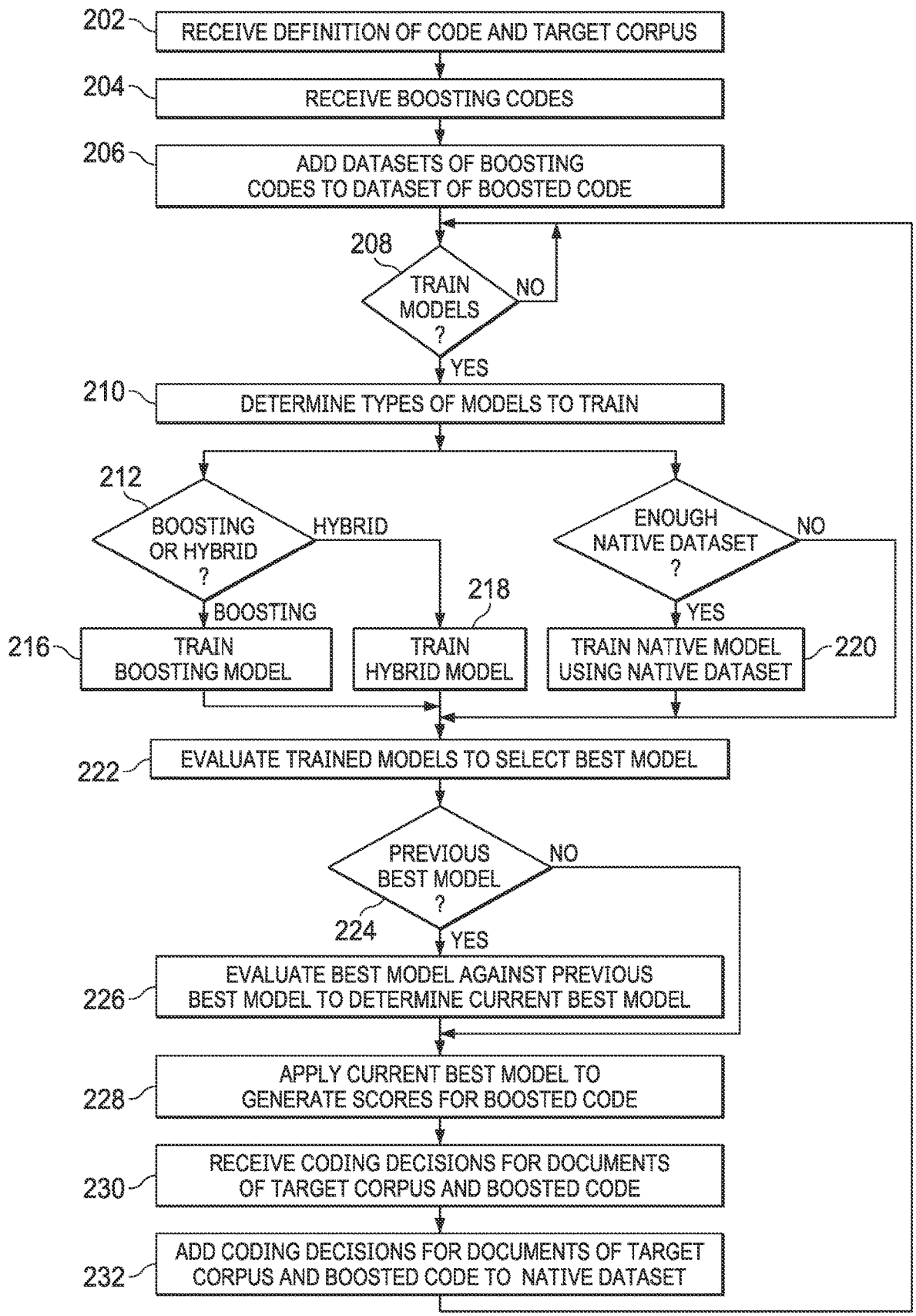

Tags

| | All tags | 201 |
|---|---|---|
| ⊞ | ▨ Responsiveness | 3 |
| ⊞ | ▨ Issue | 23 |
| ⊞ | ▨ Importance | 63 |
| ⊞ | ▦ Privilege | 2 |
| ⊞ | ▨ Enron Predictive Tags | 45 |

Add new tag group

All tags (201)

| Name | Group | Docs | Shortcut | AI Predictions |
|---|---|---|---|---|
| Bribes | Issue ⌄ | 1,245 | Shift b ⌄ | ☒ Boost |
| Docs about illegal persuasion | | | | |
| Broadband | Issue | 1,245 | Shift f | ☑ |
| Docs about broadband internet | | | | Boosted by: Internet service provider |
| Oil, Gas, or Energy | Issue | 1,245 | Shift f | ☑ |
| Docs about energy business | | | | Boosted by: Oil & Gas |
| Outside USA | Issue | 1,245 | Shift f | ☑ |
| Docs about international outside of the U.S. | | | | Boosted by: International |
| Not Work Related | Issue | 1,245 | Shift o | ☒ Boost |
| Docs that are not business related. Also, it is recommended to avoid drinking cold or very hot beverages, as they can cause throat irritation and pain, slowing down the process of healing. Also, keep away from spicy and irritant foods, as they are not | | | | |

FIG. 3A

Cross-matter AI models

Select a cross-matter AI model to accelerate and enrich predictions for this tag.

[Search]

| Name ∧ | Docs | Accuracy |
|---|---|---|
| ○ AEO<br>Confidential - Attorneys' Eyes Only* information generally has the most restrictions. This designation typically means that only the attorneys can view the information and not the parties themselves. It is generally reserved for the most sensitive information in the case. | 24,098 | High |
| ⦿ Bribes<br>Bribery refers to the offering, giving, soliciting or receiving of any item of value as a means of influencing the actions of an individual holding a public or legal duty | 24,098 | Low |
| ○ Contracts<br>A voluntary, deliberate and legally binding agreement between two or more competent parties. Contracts are usually written but may be spoken or implied, and generally have to do with employment, sale or lease, or tendency. | 24,098 | High |
| ○ Patents<br>A patent description is a part of how you patent an idea that explains the invention, design or plan you've developed and forms an essential part of your patent application with the United States Patent and Trademark Office (USPTO). | 24,098 | High |
| ○ Junk<br>unwanted or unsolicited advertising or promotional material received through the mail or by email | 24,098 | High |

[Clear]     [Cancel] [Save]

FIG. 3B

Tags

All tags (201)

- ▦ Responsiveness — 3
- ▨ Issue — 23
- ▨ Importance — 63
- ▦ Privilege — 2
- ▨ Enron Predictive Tags — 45

Add new tag group

All tags (201)

| Name | Group | Docs | Shortcut | AI Predictions |
|---|---|---|---|---|
| Bribes | Issue ⌄ | | Shift b ⌄ | ☑ Boosted by: Bribes Edit |
| Docs about illegal persuasion | | | | |
| Broadband<br>Docs about broadband internet | Issue | 1,245 | Shift f | ☑ Boosted by: Internet service provider |
| Oil, Gas, or Energy<br>Docs about energy business | Issue | 1,245 | Shift f | ☑ Boosted by: Oil & Gas |
| Outside USA<br>Docs about international outside of the U.S. | Issue | 1,245 | Shift f | ☑ Boosted by: International |
| Not Work Related<br>Docs that are not business related. Also, it is recommended to avoid drinking cold or very hot beverages, as they can cause throat irritation and pain, slowing down the process of healing. Also, keep away from spicy and irritant foods, as they are not | Issue | 1,245 | Shift o | ☒ Boost |

FIG. 3C

| ☐ DISCO \| ≡ MENU | | | DEMO  ◯  ❓ |
|---|---|---|---|
| Matters  Users  Metrics  AI Models  Settings | | | |

Cross-matter AI models

🔍 Search      [ Add model ]

| Name ∧ | Tags using | Tags powering | Accuracy |
|---|---|---|---|
| ▸ AEO<br>Attorney's eyes only | 3 | 3 | High |
| ▸ Bribes<br>To influence the judgement or conduct of (someone) with or as if with offers of money or favor : to induce or influence by or as if by bribery. You should never bribe a child with candy. | 3 | 3 | High |
| ▸ Broadband<br>Docs about the broadband internet market | 3 | 3 | High |
| ▸ Oil, Gas, or Energy<br>Docs about the energy business | 3 | 3 | High |
| ▸ Outside USA<br>Docs about international outside of the U.S. | 3 | 3 | High |
| ▸ Not Work Related<br>Docs that are not business related | 3 | 3 | High |
| ▸ Inappropriate HR Content | | | |

| Cross-matter AI models | | | | |
|---|---|---|---|---|
| Name ∧ | | Tags using | Tags powering | Accuracy |
| ▶ AEO<br>Attorney's eyes only | | 3 | 3 | High |
| ▼ Bribes<br>To influence the judgement or conduct of (someone) with or as if with offers of money or favor : to induce or influence by or as if by bribery. You should never bribe a child with candy. | | 3 | 3 | High |
| Tags using  Tags powering | | | | |
| Name ∧ | Database | | Accuracy | Powering |
| Accounts receivable<br>The balance of money due to a firm for goods or services delivered or used but not yet paid for by customers | Microsoft Patch Management For Home Users | | High | ☑ |
| Confidential<br>spoken, written, acted on, etc., in strict privacy or secrecy; secret. a confidential remark; indicating confidence or intimacy. imparting private matters | System DB | | High | ☑ |
| Responsive<br>spoken, written, acted on, etc., in strict privacy or secrecy; secret. a confidential remark indicating confidence or intimacy. imparting private matters | Review DB for Client ABC | | High | ☒ |
| ▶ Broadband<br>Docs about the broadband internet market | | 3 | 3 | High |
| ▶ Oil, Gas, or Energy<br>Docs about the energy business | | 3 | 3 | High |

| ☐ DISCO \| ≡ MENU | | | | DEMO \| 🔔 \| ❓ |
|---|---|---|---|---|
| | Matters  Users  Metrics  AI Models  Settings | | | |

Cross-matter AI models

| | | | | | [Add model] |
|---|---|---|---|---|---|
| | | | | [🔍 Search] | |
| Name ∧ | | | Tags using | Tags powering | Accuracy |
| ▶ AEO<br>Attorney's eyes only | | | 3 | 3 | High |
| ▼ Bribes<br>To influence the judgement or conduct of (someone) with or as if with offers of money or favor : to induce or influence by or as if by bribery. You should never bribe a child with candy. | | | 3 | 3 | High |

Tags using    Tags powering

| | | | [🔍 Search] | | [✏️] |
|---|---|---|---|---|---|
| Name ∧ | | Database | | Accuracy | Powering |
| Accounts receivable<br>The balance of money due to a firm for goods or services delivered or used but not yet paid for by customers | | Microsoft Patch Management For Home Users | | High | [☐ ∨] |
| Confidential<br>spoken, written, acted on, etc., in strict privacy or secrecy; secret: a confidential remark; indicating confidence or intimacy; imparting private matters | | System DB | | High | [☐ ∨] |
| Responsive<br>spoken, written, acted on, etc., in strict privacy or | | Review DB for Client ABC | | High | [☐ ∨] |

"Responsive" is now powering this model  Undo  ✕

FIG. 4C

SYSTEM AND METHOD FOR ARTIFICIAL INTELLIGENCE DRIVEN DOCUMENT ANALYSIS, INCLUDING AUTOMATED REUSE OF PREDICTIVE CODING RULES BASED ON MANAGEMENT AND CURATION OF DATASETS OR MODELS

RELATED APPLICATIONS

This application is a continuation of, and claims a benefit of priority under 35 U.S.C. 120 of, U.S. patent application Ser. No. 16/881,274 filed May 22, 2020, entitled "SYSTEM AND METHOD FOR ARTIFICIAL INTELLIGENCE DRIVEN DOCUMENT ANALYSIS, INCLUDING AUTOMATED REUSE OF PREDICTIVE CODING RULES BASED ON MANAGEMENT AND CURATION OF DATASETS OR MODELS," issued as U.S. Pat. No. 11,416,685, which claims the benefit of priority under 35 U.S.C. § 119 to U.S. Provisional Application No. 62/968,659 filed Jan. 31, 2020, entitled "SYSTEM AND METHOD FOR AUTOMATED REUSE OF PREDICTIVE CODING RULES BASED ON MANAGEMENT AND CURATION OF DATASETS OR MODELS," which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to semantic analysis and understanding of electronic documents. In particular, this disclosure relates to the semantic analysis and understanding of a potentially large corpus of documents including the use of machine learning, neural networks, transfer learning or predictive coding within document analysis. Even more specifically, this disclosure relates to predictive coding of documents of a corpus and reuse of data, models or coding decisions developed with respect to one corpus in the coding of another corpus.

BACKGROUND

In the modern world, the vast majority of documents that are being created, utilized and maintained are in electronic format. A number of different situations commonly arise that require an analysis or identification of certain relevant electronic documents from a relatively large pool of available electronic documents. These types of search problems crop up in a wide variety of contexts. For example, in litigation, an entity's documents may need to be reviewed in order to identify documents that may be relevant to one or more issues in a litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what is to be shared with opposite parties. Additionally, d the course of the litigation each party may continually review those documents produced by the opposing party to locate documents relevant to the case at hand.

Litigation thus represents a microcosm of a more general problem raised by the high volume, and increasing presence and use of, electronic documents across a variety of different contexts. Namely, how can a large volume of electronic documents be understood, reviewed, or searched in order that documents relevant to a particular topic or user's interest may be located. To aid users in resolving these problems, a document analysis system may be provided in a given electronic context. A document analysis system is typically used to allow users to analyze, review, navigate or search the electronic information to return responsive electronically stored information.

Accordingly, there is constantly a need for improved systems and methods for document analysis to assist in the analysis, review, navigation, or search of such electronic documents in order to allow such document analysis systems to better aid users engaged in such tasks, including allowing users to better identify relevant electronic documents from a pool of available electronic documents.

SUMMARY

Attention is thus directed to the embodiments of document analysis systems and methods disclosed herein. Specifically, embodiments may relate previously coded datasets and trained models to new corpora and employ these previously coded datasets and trained models in the context of predictive coding. Thus, embodiments may allow a user to bundle datasets in order to form an aggregate dataset. Accordingly, the previously coded datasets and previously trained models can be reused to provide predictive scores for a new corpus with no human coding. Furthermore, the quality of this set of codes can be higher than the quality of predictive coding without such reuse due to the fact that the previously coded datasets may be much larger in scale or of higher quality. Moreover, by transferring datasets, coding decisions, or models from previous predictive coding applications (e.g., within a defined scope) the amount of labor required by predictive coding may be reduced and the efficiency of such coding improved.

Thus, embodiments may enable the reuse of prior work product across corpora by aggregating data and coding decisions from one or more corpora in order to form boosted codes, where a boosted code represents a new category formed by identifying an enumerated set of codes as a single category and forming a composite dataset accordingly. A predictive coding process may train models incrementally as coding decisions are made across the boosted codes based on the composite datasets. The models for these boosted codes may then be used to augment or preempt predictive coding in another corpora, which may or may not be associated with the boosted code (or any of the boosting codes). Additionally, testing procedures can be used to decide between the use of boosting, hybrid, or native models in predictive coding for boosted codes.

To achieve these capabilities, among others, embodiments of document analysis systems as disclosed herein may (a) record and analyze the meaning of previously observed codes and the quality of datasets and models for previously coded corpora to which predictive coding has been applied; (b) manage the relationships among previously coded datasets and models based on the meaning and quality of previously coded datasets and models in order to offer datasets and models for codes with common meaning; (c) manage these datasets and models in the context of a system in which access to the previously coded data may be ephemeral or temporary; (d) discover potentially relevant codes from among the datasets and models and apply them to a new corpus; and (e) monitor the quality of reused datasets and models as applied to new corpora in order to guarantee that the quality achieved by an overall predictive coding system incorporating reused codes is not less than the quality of the same system without reused codes.

Embodiments as presented herein may thus have a number of advantages. As one advantage, embodiments may provide labor savings due to the fact that machine coding recommendations are available faster (potentially immediately) and may be more accurate due to the reuse of previous coding decisions. These machine coding recommendations may be accurate and rapidly produced even on small corpora by leveraging the "knowledge" gleaned from other data sets. In addition, a boosted code can be applied to generate predictive coding recommendations before a single document has ever been coded. Furthermore, if several corpora are being coded in parallel, each of which has one or more codes that participate in a common dataset, the coding decisions on one matter can benefit the review process in all the others, resulting in increased learning speed and consequent productivity. Thus, embodiments may employ continuous learning as new coding occurs in other corpora while also providing the opportunity to incorporate data from new corpora into predictive coding for existing corpora. Embodiments may also offer testing and evaluation to assess the value of the reuse of codes and to test boosting or hybrid models (e.g., relative to a native model built solely from a single corpus.

As yet another advantage, embodiments may employ models and associated training processes that protect against the disappearance of data on which these models are built. When data disappears, the model built from the data does not disappear and is still available to be applied to score documents of a corpus. In this manner, embodiments allow a model to convey the benefit or knowledge gleaned from data without the liability of having to actually keep the data around. Such capabilities may be especially useful in certain spaces where data may be more ephemeral or walled off (e.g., in a litigation context).

In one particular embodiment, a system for document analysis may include a data store, comprising a first target corpus of electronic document and a second target corpus of electronic documents. The document analysis system may receive a definition of a first code in association with the first target corpus and create a first dataset for the first code. The document analysis system can also receive an indication that the first code is to be boosted with a second code, wherein the second code is associated with the second target corpus and the second code is associated with a second dataset comprising a first set of positive signals associated with the second code and documents of the second corpus and a first set of negative signals associated with the second code and documents of the second target corpus. This indication may be received, for example through an interface that presents the second code as one of a plurality of codes, each of the plurality of codes presented with an associated textual description in the interface.

The second dataset associated with the second code and the second target corpus can be added to the first dataset of the first code such that the first dataset comprises a boosting dataset including the second dataset comprising the first set of positive signals associated with the second code and documents of the second corpus and the first set of negative signals associated with the second code and documents of the second target corpus The document analysis system of embodiments can train a first machine learning model for the first code on the boosting dataset of the first dataset and generate predictive scores for the first code for documents of the first target corpus using the first machine learning model. These predictive scores can be presented (e.g., to a user) in association with documents of the first target corpus to a user.

In some embodiments, the first machine learning model is trained only on the boosting dataset. In particular embodiments, the data analysis system may receive coding decisions for documents of the first target corpus with respect to the first code and store the coding decisions in association with the first dataset associated with the first code such that the first dataset comprises a native dataset comprising a second set of positive signals associated with the first code and documents of the first corpus and a second set of negative signals associated with the first code and documents of the first corpus.

A second machine learning model can then be trained for the first code on the native dataset of the first dataset. The first machine learning model and the second machine learning model are evaluated to select a best machine learning model based on a test set of documents of the first corpus and predictive scores for the first code for documents of the first target corpus are generated using the best machine learning model and presented in association with documents of the first target corpus to a user.

According to a specific embodiment, evaluating the first machine learning model and the second machine learning model to select the best machine learning model may include determining a current best machine learning model from the first machine learning model and the second machine learning model, and comparing the current best machine learning model to a previous best machine learning model using the test set of documents of the first target corpus to select the best model. The first machine learning model for the first code may be trained on the boosting dataset of the first dataset or the boosting dataset in combination with the native dataset of the first dataset.

In one embodiment, the boosting dataset includes a plurality of datasets, each dataset having respective positive signals and negative signals, and training the first machine learning model for the first code on the boosting dataset comprises selecting a positive signal and a negative signal from each of the plurality of datasets according to a balancing method.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a flow diagram of one embodiment of a method for the automated reuse of datasets or models in document analysis.

FIGS. 3A, 3B and 3C are examples of interfaces that may be utilized by embodiments of a document analysis system.

FIGS. 4A, 4B and 4C are examples of interfaces that may be utilized by embodiments of a document analysis system.

DETAILED DESCRIPTION

Figures 1, 1A:
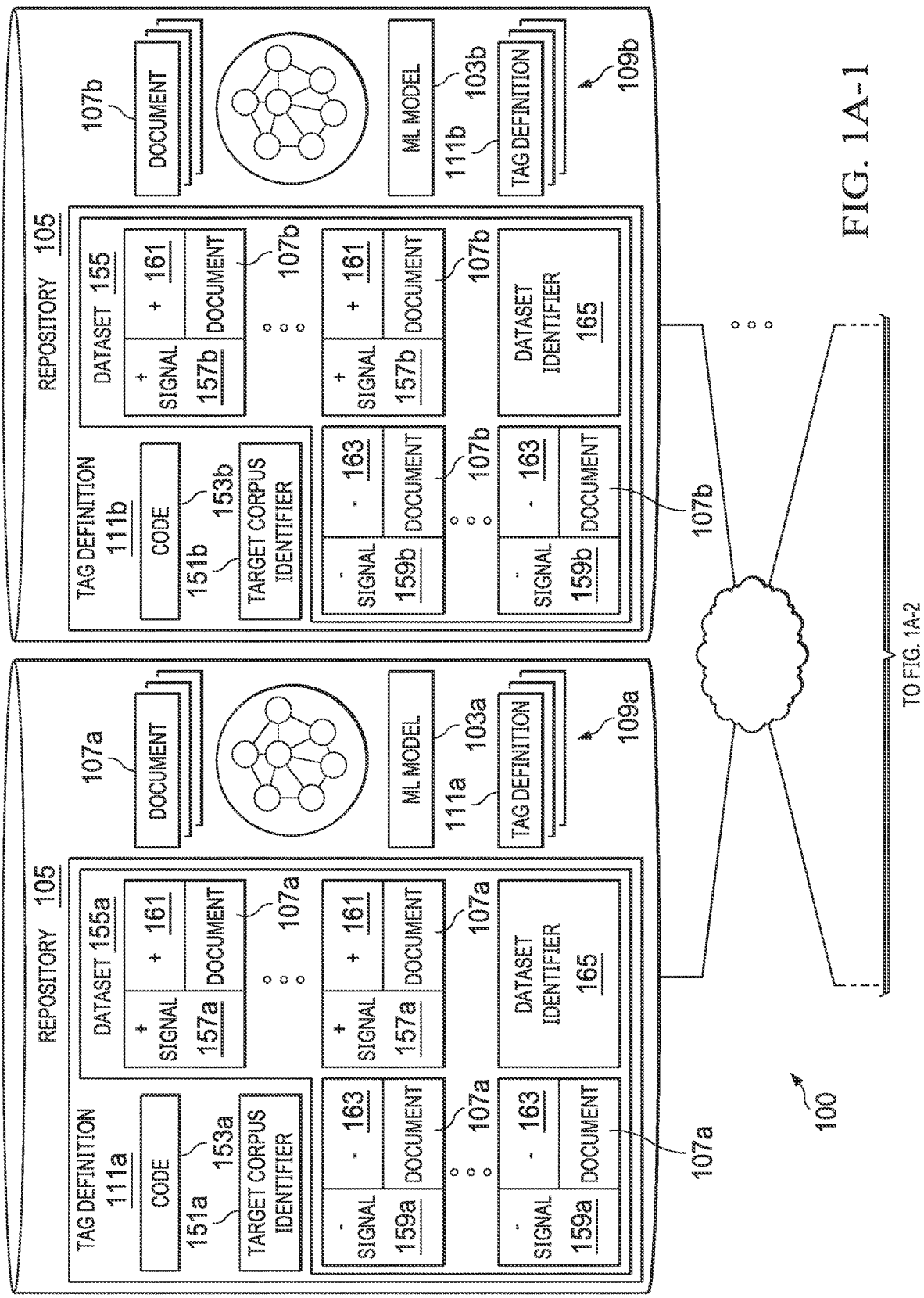
FIGS. 1A-1, 1A-2, 1B-1, 1B-2, 1C-1 and 1C-2 are block diagrams of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in detail, it may be helpful to discuss some context around document analysis systems. As discussed herein, a number of different situations commonly arise that require an analysis or identification of certain relevant electronic documents from a relatively large pool of available electronic documents. These types of search problems crop up in a wide variety of contexts. For example, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand.

Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system may be provided in a given electronic context. A document analysis, document review, information retrieval, or search system (which all will be utilized here substantially interchangeably) is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

In the legal domain, as well as other domains, these document analysis systems may be required to review and analyze a large corpus of documents. In some of the instances it may be desired to review and code the documents of a corpus according to a list of classification criteria that may be arbitrarily nuanced or complex. One standard approach to this task is to engage a team of human reviewers to examine each document in the corpus in order to apply the correct codes (or labels) to those documents. In recent years, several systems have been designed and built to speed up this process with the use of machine learning.

One method, known as predictive coding, requires human reviewers to code (also referred to as label) a set of documents with the coded documents forming a dataset for machine learning that is used to train a predictive model that suggests codes for the remaining documents, with each suggested code having some degree of confidence or strength that may be indicated to the reviewer as a predictive score for the code. These predictive scores may be used to assist in the coding of the remaining documents, for example, by sorting the documents into priority order or searching for those documents that are predicted highly likely for some code. As the set of coded documents grows, new models may be trained as needed to improve the predictive scores. By incorporating statistical methods to exclude documents from review once all documents likely to be coded have been found with high probability, predictive coding can save a substantial fraction of review cost, frequently between 30%-70% and sometimes in excess of 90% for large corpora.

One challenge for predictive coding is the iterative nature of coding in which the human codes documents: the machine models the coded documents, and then the human codes more documents with the machine modeling the new documents ad infinitum. This iterative process must be restarted every time a new review begins. The many iterations in this method are wasteful of the human's time and effort, especially in cases where new corpora are substantially similar to previously coded corpora.

It would instead be desirable to utilize the prior work product or generated machine-learning models to provide, or assist in providing, coding descriptions for the coding of new corpora of documents.

To that end, among others, embodiments of document analysis systems and methods as disclosed herein may allow the reuse of coded datasets defined in association with a particular code (referred to as the boosting code) by allowing these coded datasets to be bundled to define a boosting dataset for another code, where that code (referred to as the boosted code) may be associated with a target (e.g., new or existing) corpus of documents (referred to also herein as the native corpus). A model can then be trained (referred to as the boosting training process) based on that boosting dataset (referred to herein as the boosting model) and used to provide predictive scores for the documents of the target corpora with respect to the boosted code. Furthermore, this boosted code can be applied not just to the target corpus of documents, but additionally can be applied against any other corpora, including corpora from which the boosting codes were originally obtained or associated with, or corpora that may be accessed at a future point.

Accordingly, embodiments may utilize coded datasets available from other (or the same) corpora using a related set of codes. Thus, embodiments may allow a user to bundle datasets associated with different corpora or codes in order to form the aggregate boosting dataset. As such the previously coded datasets can be reused to provide an initial set of predictive scores for that boosted code for a target (e.g., new) corpus, even in the absence of any human coding of documents of the new corpus. Furthermore, the quality of this initial set of scores can be higher than the quality of predictive coding without such boosting (e.g., even though several iterations of predictive coding) due to the fact that the previously coded datasets may be much larger in scale or of higher quality.

Moreover, as the documents of the target corpus are coded with respect to the boosted code, or other input is received with respect to the boosted code, a native dataset comprising documents of the target corpus that have been coded with respect to the boosted code may be formed. Embodiments may thus train a model for the boosted code using the native dataset (referred to as the native model) based on the native dataset alone (e.g., without use of the booting dataset). This training may be referred to as the native training process. To provide the most accurate predictive coding scores for the boosted code, the boosting model trained for the boosted code can be compared (e.g., using an A/B comparison or the like) against the native model for the boosted code trained in this native training process. This comparison may happen, for example, when predictive scores are generated for documents for the boosted code for presentation to a user. The model (e.g., the boosting model or the native model) that wins this comparison may be utilized to provide predictive scores for the documents of the target corpora with respect to the boosted code.

In some embodiments, the native dataset may be added to the boosting data set and a model trained from this combined dataset. For clarity of reference, this combined dataset (e.g., the boosting dataset plus the native dataset) will be referred to as the hybrid dataset, the model trained on this hybrid dataset will be referred to as the hybrid model and the training process referred to as the hybrid training process. In this manner, the model for the boosted code is trained not only on the data of the corpora associated with each of the original boosting codes, but additionally may be trained on data associated with the target corpus. This hybrid model for the boosted code can similarly be compared against the boosting model (e.g., trained on the boosting dataset alone) generated for the boosted code (e.g., if one has been generated) or the native model for the boosted code (e.g., if one has been generated). The model (e.g., the boosting model, hybrid model or the native model) that wins this evaluation may be utilized to provide predictive scores for the documents of the target corpora with respect to the boosted code.

To ensure that the most accurate model is being used for the boosted code (e.g., as applied to documents of the target corpus), in one embodiment only documents (e.g., a test set of documents) from the target corpus may be used to evaluate or compare (used interchangeably herein) the boosting model, hybrid model or the native model for the boosted code. Thus, each existing model for the boosted code may be evaluated (e.g., using an inference procedure or the like) and the best model according to this evaluation is selected to generate predictive coding scores for the documents of the target corpus such that, for example, the predictive coding scores produced by the model with the better evaluation are the scores presented to the user for the documents of the target corpus relative to the boosted code.

In one embodiment, in order to maintain consistency, the models produced by each training process (e.g., boosting, hybrid or native) may be archived or otherwise stored. A training process may be initiated, for example, when a test set of documents (e.g., of the target corpora) changes. During one or more of the training processes, when a current model (e.g., boosting model, hybrid model or native model) is trained this currently trained model may be evaluated against at least one previously trained respective model (e.g., the best previously trained model) to determine which of the respective models is the best for those models. For example, a currently trained boosting model may be evaluated against a previously trained boosting model to determine which of the two is the best boosting model, a currently trained hybrid model may be evaluated against a previously trained hybrid model to determine which of the two is the best hybrid model or a previously trained native model may be evaluated against a previously trained native model to determine which of the two is the best native model. This evaluation for the respective model may be done, for example, on the new test set of documents. Each of the best of the respective models (e.g., boosting, hybrid or native) may then be evaluated against one another on the new test set of documents as discussed to select the best of these models (e.g., the boosting model, hybrid model or the native model) to provide predictive scores for the documents of the target corpora with respect to the boosted code.

As a model (e.g., a boosting or hybrid model) may have been trained on data that is no longer available (e.g., the corpus comprising the dataset on which it was initially developed may no longer available), the evaluation of these previously generated model may allow previously generated models to be utilized in the document analysis system to perform predictive coding. Thus, although the old data may no longer be available for training, a model trained on the old data is still available, and if this model has better performance on the new test set, it may be used to generate predictive scores for the boosted code. This aspect of embodiments may be quite advantageous, as it allows the retention of quality models in an environment of changing or segregated data.

To illustrate in more detail, a tag may be thought of as a subset of documents of a corpora that should be categorized together and assigned a specific code, name or label (used herein interchangeably). In practical terms however, in the realm of document analysis systems, the idea of a tag is a theoretical concept, as there is little to no way of fully and definitively determining or delineating this subset of documents with respect to a corpora without some degree of human intervention. While document analysis systems may classify or score documents with respect to the code to approximate which documents belong to the associated tag, unless a reviewer manually codes each document, there is no way for such document analysis systems to definitively determine if documents that are not manually coded belong to that tag.

Embodiments of document analysis systems may thus give a prediction (or score) reflective of a determination of likelihood or confidence that a document belongs to a tag (and thus should be assigned the code for that tag). To generate such a prediction, embodiments of a document analysis may utilize a tag definition to allow a model for determining such predictions to be generated. This tag definition includes the code for the tag (e.g., the code to be assigned to documents that are part of that tag) and a target corpus. The tag definition may also include a dataset for the tag that includes positive signals for the tag and negative signals of the tag. The positive signals include a document (or reference thereto) and an annotation indicating that the document belongs to the tag (e.g., as indicated by the document being manually coded with the code by a human user). The negative signals include a document of (or reference thereto) and an annotation indicating that the document does not belong to the tag (e.g., as indicated by the document being manually coded as not being assigned the code by a human user). The dataset for a tag definition may thus be referred to as a coded dataset for the tag (or tag definition) as it comprises documents that have been assigned the code (and thus designated as belonging to the tag) or indicated as not being assigned the code (and thus designated as not belonging to the tag).

Based on that tag definition, then, embodiments may train a model (e.g., a machine learning model) based on the positive and negative signals of the coded dataset of the tag definition and used the trained model to generate predictive scores for the documents of the target corpora with respect to the code of that tag definition. In other words, a predictive score may indicate a likelihood that an associated document may belong to the tag (and should thus be labeled with the associated code).

Embodiments of document analysis systems and methods as disclosed herein may thus allow the reuse of a coded dataset for a tag definition associated with a particular code (the boosting code) and corpus by allowing the coded datasets of that boosting code to define a (boosting) dataset for another code, where that code (referred to as the boosted code) may be associated with a target corpus of documents. In particular, a user may define a code (e.g., label) in association with a particular target corpus using an interface. The definition of the code by the user may create an associated tag definition at the document analysis system with an identification of the target corpus of documents and the code. In some embodiments, the user may also use the interface to add a text annotation or other description (e.g., a natural language description or textual blurb) for the code being defined that may explain the code, its relevance or history, or any other information the user wishes to explicate regarding the code. This text description may be stored in association with the tag definition for the code.

At some point (e.g., when the code is defined, or at a later point) a user (the user who defined the code or another user) can then boost this code (the boosted code) by associating another code (the boosting code) with the boosted code using an interface of the document analysis system. Specifically, in certain embodiments, an interface may be provided by the document analysis system that allows a user to interact with (e.g., search for, review, sort, etc.) the codes defined in the document analysis system. This interface may allow users to select codes to use for boosting, including codes defined for different corpora. This ability is quite advantageous for users of such document analysis systems in many contexts. For example, typically in a litigation context, codes defined for one corpus of document (e.g., a particular matter) and the associated datasets will not be available for reuse as matters must be kept private and confidential. Moreover, in these settings there is usually no user who has the knowledge of, or access to, codes across these different corpora.

By providing a document analysis system where datasets associated with codes across these distinct corpora may be bundled without allowing cross-pollination of the documents of those corpora (or access to these documents), these document analysis systems provide a mechanism where the knowledge and insight gained with respect to a code associated with one corpus may be leveraged to improve the predictive coding associated with another code in a completely different matter. Additionally, by providing the aforementioned textual description in association with codes, along with an interface to review and select such codes for boosting across corpora document analysis systems may open the door for provisioning of new roles within enterprises (e.g., law firms, accounting firms, etc.) that handle distinct corpora of documents. These roles may include, for example, a code or document analysis curator role that may be responsible for managing or evaluating the codes utilized by the enterprise across the various corpora being analyzed by the document analysis system, including the definition of codes and the selection of which codes should be used to boost other codes.

The interfaces of embodiments may thus provide such a curator, or other users of the document analysis system, with highly effective interfaces for accomplishing these types of tasks, among others, by providing the ability to interact with (e.g., search for, review, sort, etc.) the codes defined in the document analysis system, where the textual descriptions of the codes may be presented in association with the various code if a textual description exists. These users can thus use such interfaces to select a code to be boosted (the boosted code) and the codes to use for boosting, including codes defined for different corpora, based on the textual description of the various codes, the knowledge of the curator, or some other criteria (e.g., a user who initially defined the code, the corpus associated with a code, etc.).

In any event, once a code (e.g., the boosting code) is selected to boost a particular code (e.g., the boosted code), the boosted code is then "boosted" by the document analysis system by bundling the dataset associated with boosting code with the dataset associated with the boosted code. Specifically, in one embodiment, the dataset of the tag definition associated with the boosted code is updated to include the dataset of the tag definition associated with the boosted code. Thus, the positive signals and the negative signals of the dataset associated with the boosting code may be included in the set of positive and negative signals included in the tag definition associated with the boosted code. The union of these datasets is thus the boosting dataset associated with the boosted code. As the boosting code may be associated with a different corpus than the target corpus associated with the boosted code, by boosting the boosted code with the boosting code, the positive and negative signals associated with documents of this different corpus (associated with the boosting code) may be included in the boosting dataset of the boosted code. In one embodiment, when creating the boosting dataset, any negative signals that are also in the set of positive signals may be removed from the set of negative signals of the dataset.

Thus, as the boosting dataset may be used to train one or more models that may be used to generate predictive codes for the target codes, the bundling of datasets associated with different codes and corpora for use in training models for use on a different target corpus may provide an extremely powerful mechanism for generating high quality predictive scores for that boosted code for the target corpus, allowing "knowledge" gained from other corpus of document to be bundled together and applied to completely new set of documents even in the absence of any human coding of documents of the target corpus. In this manner, these composite or boosted codes serve as classifiers that exist above the corpus level and can be re-purposed or reused across corpora of documents in a document analysis system. Moreover, the power of such bundling may be more fully realized when it is understood that that boosting code may itself be a boosted code, such that the dataset of a boosting code may itself include positive and negative signals associated with multiple (e.g., boosting) codes and multiple corpora. In this manner, by boosting a code with another code that is itself a boosted code, large and informative dataset may be aggregated and used to generate highly effective predictive models. Furthermore, a boosted code can be applied not just to the target corpus of documents, but additionally can be applied against any other corpora, including corpora from which boosting codes were originally associated with, or corpora that may be accessed at a future point.

Looking now at FIG. 1A, a block diagram of one embodiment of a document analysis system that allows the use of boosted codes for predictive coding is depicted. The document analysis system 101 is part of computing environment 100 including one or more repositories 105, document analysis system 101, and one or more client computers 130. Repository 105 may comprise a file server or database system or other storage mechanism remotely or locally accessible by document analysis system 101 which, according to an embodiment, may be almost any SQL or NoSQL platform such as MongoDB, Elasticsearch or the like. Repository 105 may store documents 107 that document analysis system 101 may allow users accessing the document analysis system 101 to review (e.g., navigate, search, code, etc.). The documents 107 of the repository 105 may comprise one or more corpora 109. Thus, documents 107a may comprise one corpus 109a, documents 107b may comprise another corpus 109b, documents 107n another corpus 109n, etc. The corpora may correspond to, for example, different matters in a litigation context, different divisions or corporate entities in a business instance, or some other division or documents 107.

In the depicted embodiment document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide document analysis application 122. Predictive coder application 122 may be implemented on the same computing systems or can be distributed across multiple computing systems, platforms or physical or virtual server. Again, it will be noted here that while embodiments described and depicted herein may include a deployment of a document analysis system on a physical computing device other embodiments may include the document analysis system deployed as a service on, for example, a cloud computing environment or otherwise deployed without loss of generality.

Client computer systems 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus 109. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the predictive coder 122, which may be, for example a web services interface, an Application Programming Interface (API) or another type of interface.

Again, those skilled in the art will appreciate that document analysis system 101 shown in FIG. 1A is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server or other computing system.

The document analysis system 101 may provide predictive coding capabilities to users reviewing the documents 107 of a corpus 109 through predictive coder 122 (e.g., through interface 134). Using an interface (e.g., interface 134) a user at a client device 130 may define a code in association with an associated (target) corpus 107a, 107b, 107n. When a user defines such a code for a corpus 109, there is a subset of documents of this target corpus that should be categorized together and assigned this code. The subset of documents 107 of the target corpus can be referred to as a tag.

Predictive coder 122 may thus be adapted to generate a score reflective of a determination of a likelihood or confidence that a document of the target corpus 109 belongs to a tag (and thus should be assigned the code). To generate such a prediction, embodiments of a document analysis may utilize a tag definition to allow a model for determining such predictions to be generated. Accordingly, when a user defines such a code, a tag definition 111 for that code may be created by the predictive coder 122 in association with the target corpus 109. The tag definition 111 may include a corpus identifier 151 identifying the target corpus and the defined code (or label) 153 for the tag (e.g., the code assigned to documents that are part of that tag). The tag definition 111 may also include a dataset 155 that includes positive signals 157 for the tag and negative signals 159 for the tag. The dataset may also include a dataset identifier 165 that allows the dataset (e.g., set of positive and negative signals 157, 159 to be identified as a group. The positive signals 157 include a document 107 (or reference thereto) and an annotation 161 indicating that the associated document 107 belongs to the tag (e.g., as indicated by the document 107 being manually coded with the code 153 by a human user). The negative signals 159 also include a document 107 of the (or reference thereto) and an annotation 163 indicating that the associated document 107 does not belong to the tag (e.g., as indicated by the document being manually coded as not being assigned the code 153 by a human user).

To illustrate, tag definition 111*a* may be defined for code 153*a* and may be associated with corpus 109*a* though target corpus identifier 151*a*. The tag definition 111*a* may also include dataset 155*a* identified by dataset identifier 165*a* and having positive signals 157*a* and negative signals 159*a* associated with documents 107*a* of the target corpus 109*a*. Each positive signal 157*a* may include an associated document 107*a* (or a reference to such a document 107*a*) and a (positive) annotation 161 that the associated document belongs to the defined tag (e.g., has been associated with the code 153*a*, such as by a human code or otherwise). Conversely, each negative signal 159*a* may include an associated document 107*a* (or a reference to such a document 107*a*) and a (negative) annotation 163 that the associated document 107*a* does not belong to the defined tag (e.g., has been indicated as not being associated with the code 153*a*, such as by a human code or otherwise).

ML model builder 124 may generate or train an ML model 103 for to generate predictive scores for each tag definition 111. Specifically, for each tag definition 111 the ML model builder 124 may train an associated ML model 103 based on the dataset 155 associated with that tag definition 111 (e.g., the positive signals 157 and negative signals 159 of the dataset 155). For example, ML model builder 124 may train ML model 103*a* for tag definition 111*a* based on positive signals 157*a* and negative signals 159*a* of dataset 155*a*. The training of such ML models 103 may, for example, occur at different intervals based on criteria that may be associated with the corpus 109 with which the tag definition 111 is associated (such as newly received positive or negative signals being added to a dataset 155 of the tag definition 111 (e.g., a human has coded additional document), timing criteria (e.g., every day, weekly, etc.), or some other criteria. The training of such ML models is described in U.S. patent application Ser. No. 16/167,205 entitled "Methods and Apparatus for Asynchronous and Interactive Machine Learning Using Attention Selection Techniques" by Lockett incorporated herein by reference in its entirety for all purposes.

Thus, tag definition 111 can be associated with a corpus 109 and ML model 103 trained on the dataset of the tag definition 111 to generate predictive scores for the documents 107 of the associated target corpus 109, with respect to the code 153 of that tag definition 111. In other words, a generated predictive score may indicate a likelihood that an associated document 107 may belong to the tag (and should thus be assigned the associated code 153). The predictive scores for the tag definitions 111 for the documents 107 of the associated corpus 109 can be presented to the user through the interface (e.g., interface 134) and feedback (e.g., coding decisions, including additional positive or negative signals) may also be received through interface 134 and used to, for example, update the datasets 155 associated with each tag definition 111.

As discussed, embodiments of document analysis system 101 may also allow the reuse of the coded dataset for a tag definition 111 associated with a particular code 153 (the boosting code) and corpus 109 by allowing the coded datasets 155 of that boosting code to define a (boosting) dataset 155 for another code 153, where that code 153 (referred to as the boosted code) may be associated with a target corpus 109 of documents 107.

Figures 1, 1A, 2:
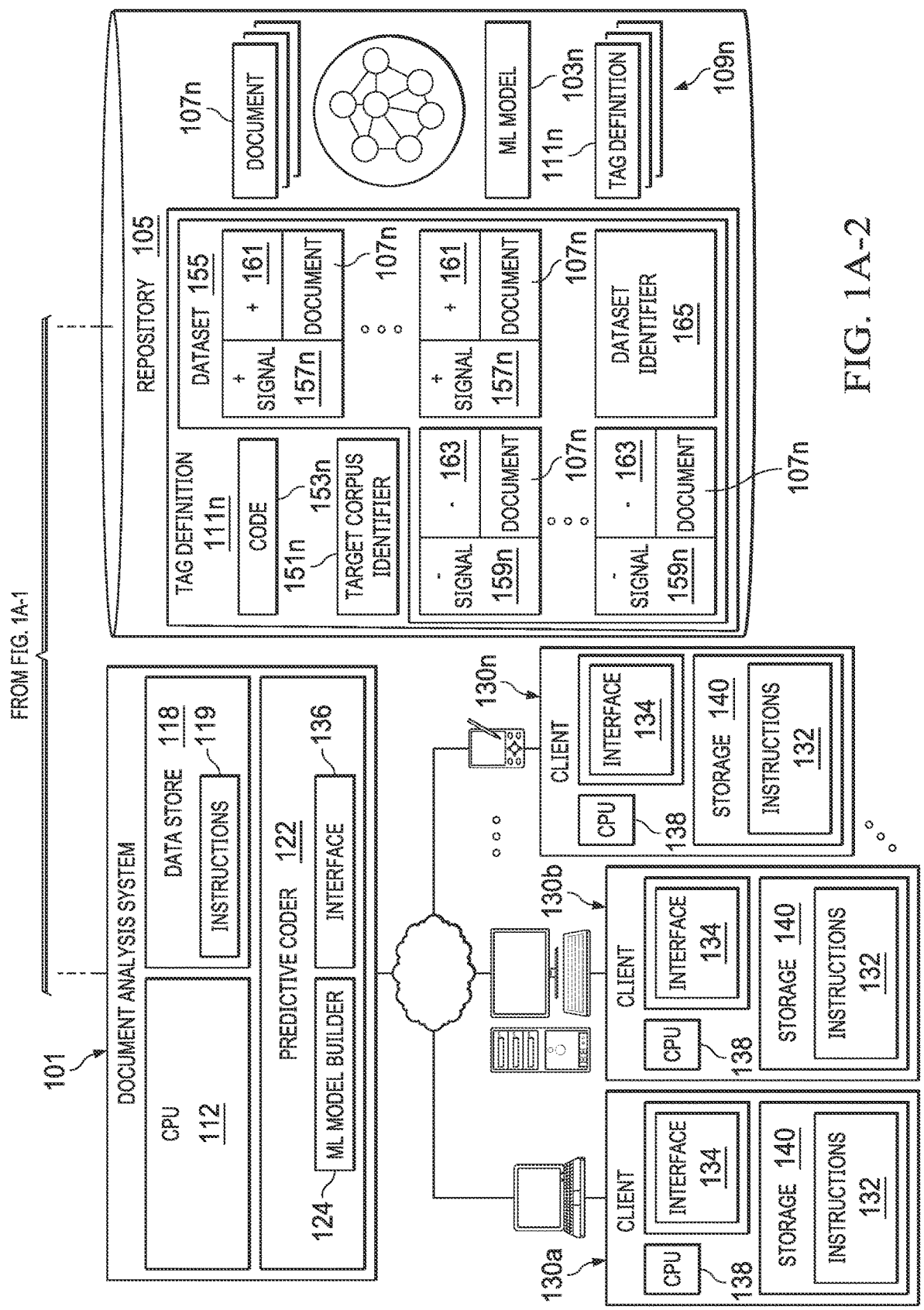
Figures 1, 1B:
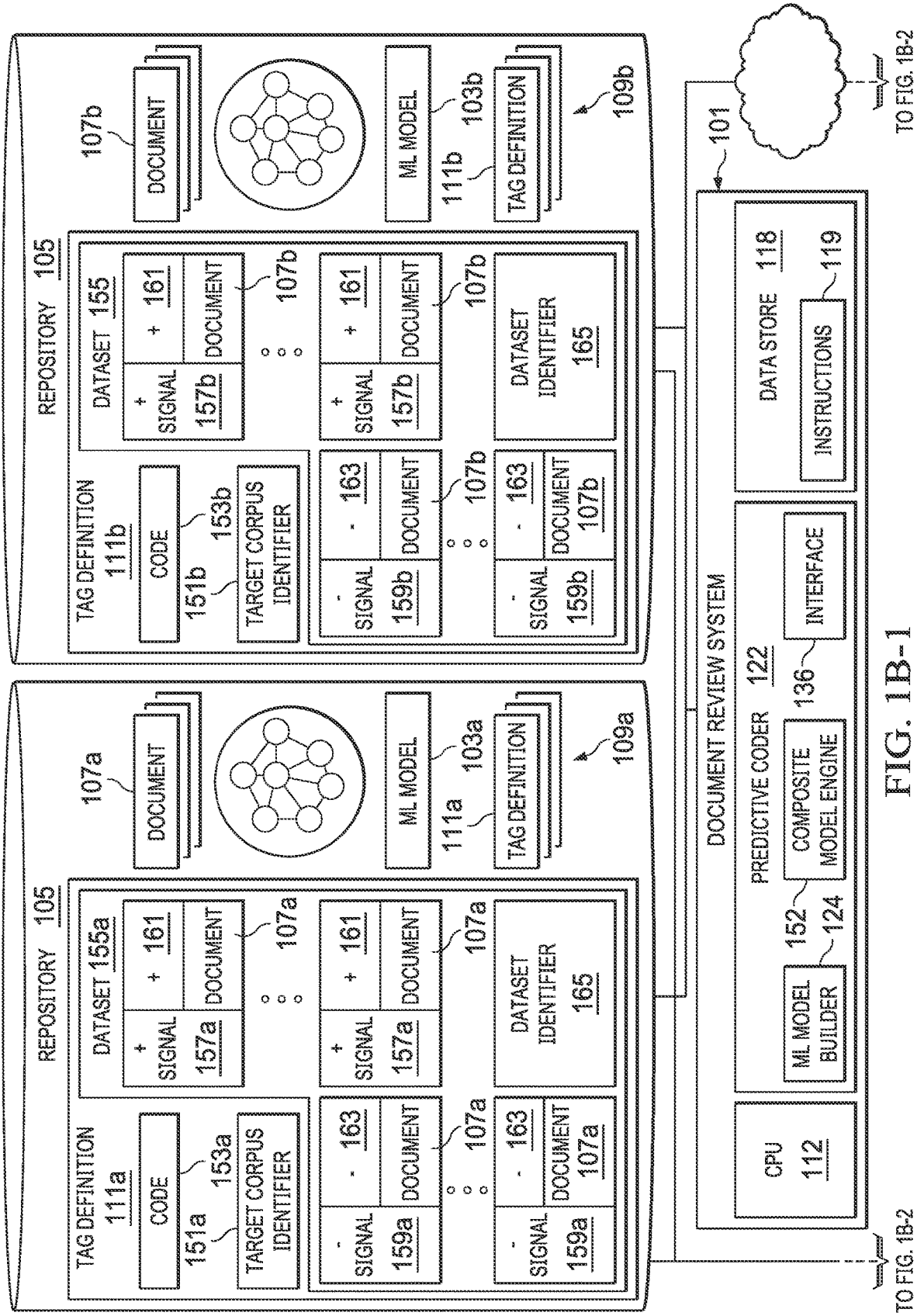

Moving on to FIG. 1B (where clients 130 have been removed from the diagram for ease of depiction), predictive coder 122 may also provide predictive coding functionality by which users can define a reusable code associated with one or more corpora 109. In particular, a user may define a code (e.g., label) in association with a particular target corpus 109 using an interface 136. The definition of the code by the user may create an associated tag definition 111 at the document analysis system with an identification of the target corpus 109 of documents 107 and the defined code.

Specifically, the interface 136 that may be provided to a client 130 may allow a user to may designate a code and "boost" this code with one or more previously generated codes (e.g., which may themselves be boosted codes). The interface 136 may also allow a user to select one or more (e.g. native) corpora 109 to which the code should be applied (e.g., where predictive scores for the code should be generated for the documents 107 of that corpus), including a new corpus 109*x* of documents.

In some embodiments, the interface 136 offered by the predictive coder 122 may be different, or have different functionality, based on a type of the user (e.g., based on a user's access rights or credentials). For example, types of users may include a curator (e.g., a curator persona) or a reviewer (e.g., a reviewer persona). For example, in the legal context, at present most legal matters are managed separately, and there is no one person who understands which codes can be bundled. As part of embodiments, a curator interface may allow a curator to supervise and manage the bundling of codes (e.g., the creation of boosted codes and the application of those tag bundles across corpora).

For example, certain embodiments of the interface may allow a user, such as a curator or a creator of a code, to add a text annotation or other description (e.g., a natural language description or textual blurb) for the code being defined that may explain the code, its relevance or history, or any other information the user wishes to explicate regarding the code. This text description may be stored in association with the tag definition for the code. In many systems at present, user codes are named or labeled in a manner that is opaque to the digital systems in which those codes are applied. Review teams typically write down a set of rules or specification for how codes are to be applied, but these rules are stored separately and cannot be accessed and used by machine code. To remedy this situation, embodiments of interfaces utilized herein may allow users to enter in a freeform text description of a code being created in the interface or to upload the review instructions for use by machine learning or other programmatic methods. These descriptions or instructions provided by the user through the interface 136 may be used to assist curators in deciding which codes can be bundled (e.g., to form a new dataset).

Additionally, in one embodiment, an interface for a curator persona (e.g., a user who is a curator) may provide a list of available codes, their general statistics including the number of positive and negative signals (e.g., from a particular corpus 109) for the code, the textual descriptions for each code, if available, or an accuracy metric that can be used to judge the quality of the code and its relevance. The curator can then create new codes (e.g., boosted codes) from one or more extant codes and manage existing boosted codes by adding or removing codes (e.g. boosting codes) from this boosted code. The curator can also be provided with alerts when codes are selected to boost a code or when the document review system detects a potential match for a boosted code. These features make it easy to reuse existing datasets by selecting appropriate codes for boosting. Moreover, when a dataset (or portion thereof, or corpus) associated with a code that is used to boost another code is removed from the system, the curator may be notified that this alteration has occurred (e.g., through a user interface or via electronic mail, etc.). The curator then has the option to add new (e.g., boosting) codes to the boosted code or to review metrics and statistics generated based on the new dataset for the code.

A reviewer interface may also be provided by interface 136 for a reviewer or review manager. These review managers may be people who (e.g., during legal discovery or the like) may be responsible for organizing and supervising the review process whose outcome is the application of a set of codes to a corpus. The review manager may make or implement decisions about whether and how to utilize machine predictions during the review process.

Accordingly, embodiments of interfaces 136 of predictive coder 122 may offer a code management panel on which a review manager (or other user) can view and edit the codes for the review process. In particular, the review manager can add or modify the description of the code and can determine whether or not machine learning will be applied to a particular code. During the process of this latter decision, the review manager (or a curator) may be provided the opportunity to "boost" a code based with another currently existing code. The review manager is shown a list of available codes together with, for example, their names, descriptions, signal statistics and current test accuracy metrics. This interface may also indicate which of these codes are themselves boosted codes and the composition of the datasets of such codes (e.g., the corpora with which they are associated). This list can be searched, sorted, or filtered in order to help the review manager find the most relevant code or codes. When the review manager selects a code to use for boosting a particular code, that boosting code is associated with the boosted code such that the dataset of the boosting code is bundled with the dataset of the boosted code, as described. A curator can be notified by a user interface or by electronic mail of the decision.

In one embodiment, when a reviewer or other user selects a boosting code for a boosted code, that dataset of that boosting code does not automatically become part of the dataset of the boosted code. A curator is, however, notified of the boosting decision and has the opportunity to include the selected code as a boosting code [ ], in which case the dataset for the selected boosting code becomes part of the dataset of the boosted code as will be described.

As discussed then, using the interface 136 of the predictive coder 122 a user at a client device 130 may create a code and associate the code with a corpus (e.g., a new corpus 109x). The definition of the code by the user may create an associated tag definition 111 at the document analysis system 101 with an identification of the target corpus 109 of documents 107 and the code 153. At some point (e.g., when the code is defined, or at a later point) a user (the user who defined the code or another user) can then boost this code (the boosted code) by associating another code (the boosting code) with the boosted code using the interface 136 of the document analysis system 101.

Once a code is selected to boost the defined code, this boosted code is then "boosted" by the document analysis system 101 by bundling the dataset 155 associated with boosting code with the dataset 155 associated with the boosted code. Specifically, in one embodiment, the dataset 155 of the tag definition 111 associated with the boosted code 153 is updated to include the dataset 155 of the tag definition 111 associated with the boosted code 153. Thus, the positive signals 157 and the negative signals 159 of the dataset 155 associated with the boosting code 153 may be included in the set of positive and negative signals 157, 159 included in the tag definition 111 associated with the boosted code 153.

The union of these datasets 155 is thus the boosting dataset 155 associated with the boosted code 153. As the boosting code 153 may be associated with a different corpus 109 than the target corpus 109 associated with the boosted code 153, by boosting the boosted code 153 with the boosting code 153, the positive and negative signals 157, 159 associated with documents 107 of this different corpus 109 (associated with the boosting code) may be included in the boosting dataset 155 of the boosted code 153. It will be understood that the dataset 155 of a boosting code may not be static (e.g., documents associated with one or more corpora 109 associated with boosting code may be predictively coded at a future point). As such the dataset 155 of the booted code can similarly be updated in the same manner as the dataset 155 of the boosting code is updated (e.g., as documents of these different corpora 109 are coded according to the boosting code). In one embodiment, when creating the boosting dataset, any negative signals that are also in the set of positive signals may be removed from the set of negative signals of the dataset.

In the example depicted, a user has defined a code 153x in association with corpus 109x, causing document analysis system 101 to create tag definition 111x in association with corpus 109x (e.g., having a target corpus identifier 151x identifying target corpus 109x) and having the code 153x. The user has also selected code 153a associated with corpus 107a and code 153b associated with corpus 107b to be used as boosting code for the defined (boosted) code 153x. Based on the selection of codes 153a and 153b as boosting codes 153 for code 153x, the dataset 155x of code 153x is boosted with the dataset 155a associated with the tag definition 111a associated with code 153a and the dataset 155b associated with the tag definition 111b associated with code 153b.

More specifically, when code 153x is boosted with boosting code 153a, the predictive coder 122 may access tag definition 111a associated with the boosting code 153a to access the positive signals 157a and negative signals 159a of the dataset 155a associated with the boosting code 153a. These positive signals 157a and negative signals 159a of the dataset 155a associated with the boosting code 153a are then added to the dataset 155x of the boosted code 153x to update the dataset 155x of the boosted code 153x. Similarly, when code 153x is boosted with boosting code 153b, the predictive coder 122 may access tag definition 111b associated with the boosting code 153b to access the positive signals 157b and negative signals 159b of the dataset 155b associated with the boosting code 153b. These positive signals 157b and negative signals 159b of the dataset 155b associated with the boosting code 153b are then added to the dataset 155x of the boosted code 153x to update the dataset 155x of the boosted code 153x. These positive signals 157a, 157b and negative signals 159a, 159b added from boosting codes 153a, 153b to the dataset 155x of the boosted code 153x thus form a boosting dataset for the boosted code 153x. Moreover, in one embodiment, as the datasets 155a, 155b of the boosting codes 153a, 153b may not be static (e.g., documents associated with corpora 109a, 109b associated with boosting codes 153a, 153b may be predictively coded at a future point), the dataset 155x of the booted code 153x can similarly be updated in the same manner as the datasets 155a, 155$b$ of the boosting codes 153$a$, 153$b$ are updated (e.g., as documents of these different corpora 109$a$, 109$b$ are coded according to the respective boosting code 153$a$, 153$b$). In one embodiment, any negative signals 159$a$, 159$b$ that are also in the set of positive signals 157$a$, 157$b$ of the dataset 155$x$ may be removed from the set of negative signals 159$a$, 159$b$ of the dataset 155$x$.

At some point then, ML model builder 124 may train boosting ML model 103$x$1 based on the dataset 155$x$ of the tag definition 111$x$ for the code 153$x$. Note that in this example, the dataset 155$x$ of the tag definition 111$x$ comprises only a boosting dataset that includes signals 157, 159 (e.g., 157$a$, 157$b$, 159$a$, 159$b$) obtained from boosting codes 153 (e.g., 153$a$, 153$b$). Thus, in this example, the boosting model 103$x$1 for code 153$x$ associated with corpus 109$x$ is generated based on signals 157$a$, 157$b$, 159$a$, 159$b$ from boosting tags 153$a$, 153$b$ associated with documents 107$a$ 107$b$ of corpora 109$a$ and 109$b$. Again, this boosting ML model 103$x$1 may be generated in a similar manner to that described in U.S. patent application Ser. No. 16/167,205 entitled "Methods and Apparatus for Asynchronous and Interactive Machine Learning Using Attention Selection Techniques" by Lockett, however, it will also be noted generally that in various embodiments ML models may be generated by different methodology, or that ML models generated from different datasets (or the same datasets) may be generated by differing methodologies, without loss of generality, In one embodiment, in order to ensure that a boosting ML model is not overly influenced (e.g., overweighed) by a particular boosting code 153 (e.g., a dataset 155 associated with that boosting code 153), the ML model builder 124 may sample positive signals 157 and negative signals 159 from each dataset 155 associated with each boosting code according to a balancing methodology. This balancing methodology may include for example, a logarithmic differential balancing method, a round robin selection process whereby a positive and negative signal is selected from each of the composite dataset 155 of the boosting dataset 155, or by some other balancing method. For instance, in the example depicted, when training boosting ML model 103$x$1 the ML model builder 124 may sample (e.g., randomly) one or more positive signals 157$a$ and one or more negative signals 159$a$ from dataset 155$a$ associated with boosting code 153$a$, followed by selecting (e.g., randomly) one or more positive signals 157$b$ and one or more negative signals 159$b$ from dataset 155$b$ associated with boosting code 153$b$, until a sufficient amount of training examples are obtained.

Specifically, according to certain embodiments, to generate a ML model 103 a neural networks model may be trained with minibatch gradient descent. The formation of the minibatches for the training may be done in a manner that ensures that the model 103 is not overly driven by a single code whose datasets 155 comprise the boosting dataset 155 of the code 153 but balances information across the corpora 109 of documents 109 associated with the bundled codes. In certain embodiments therefore, minibatches are formed two examples at a time by first randomly sampling data (e.g., documents 107) from the corpus 109 associated with a code 153 and then randomly sampling one positive signal 157 and one negative signal 159 of the dataset 155 for the code 153. The result is that minibatches are balanced having equal representation from each code 153 included in the boosting dataset 155 and equal representation between positive and negative signals 157, 159, on average.

In certain embodiments, the formation of minibatches may account for the number of documents 109 in the corpus associated with a particular code 153, in which corpora 109 with more data have a greater opportunity to provide examples to a minibatch. For example, a probability vector may be generated wherein each element of the probability vector is proportional to the logarithm of the number of signals 157, 159 in the dataset 155 corresponding to each code 153 comprising the boosting dataset 155 and then this probability vector can be used to choose a constituent code 153 such that the probability of choosing each a constituent code 153 (and signal 157, 159 of the dataset 155 associated with that constituent code 153) is logarithmically higher for codes based on larger datasets 155.

In certain embodiments, ML models 103 are trained to generate predictive scores for codes 153 by training a parameterized model on the combined dataset 155. In embodiments of machine learning, signals 157, 159 may be separated into three sets: (1) a training set used to set the parameters of a parameterized model through a training process; (2) a validation set used to manage the training process, including most commonly to decide when to exit the process; and (3) a test set used to measure the accuracy or quality of a model generated by the training process. The formation of these sets is referred to herein as signal set allocation.

This process is complicated by the fact that correlations exist among the various codes 153 applied to a particular corpus 109, and it may be desired that this set formation process guarantee that each tag (e.g., each boosting code 153 and the corpus 109 associated with the boosted code 153) is well represented within each of the training, validation, and test sets. In particular, the test set should contain substantially many examples to generate statistically valid accuracy metrics, and the training set should include enough examples to train a model with good generalization performance. In one embodiment, the algorithm utilized may be similar to that described in Sechidis, Tsoumakas, and Vlahavas, "On the Stratification of Multi-Label Data" (D. Gunopulos et al. (Eds.): ECML PKDD 2011, Part III, LNAI 6913, pp. 145-158, 2011; Springer-Verlag: Berlin, Heidelberg) hereby incorporated by reference in its entirety.

In one embodiment, each dataset 155 is associated with a signal set allocation that is lifted from the datasets 155 of the constituent codes 153. Thus for a given dataset 155, its training set is the aggregation of the training set for each code 153, and similarly for the validation set and testing set. The accuracy of the data sets is measured after each training process based on the test set for the dataset 155. Thus the meaning of the accuracy test changes as new datasets 155 for new boosting codes 153 are added to the dataset 155 of the boosted code 153 and old boosting codes 153 and their datasets 155 are removed from the dataset 155 of the boosted code 153.

Once boosting ML model 103$x$1 is trained based on the dataset 155$x$ of the tag definition 111$x$ for the code 153$x$, it can then be used to predictively code (e.g., score in association with the code 153$x$) documents 107$x$ from the corpus 109$x$ (e.g., document from a new corpus 107$x$) and such predictive scores may be returned to a user. In this manner, an ML model 103$x$1 may be trained using a dataset 155$x$ comprising signals associated with different corpora 109$a$, 109$b$ and applied to a new corpus 109$x$ to predictive coding decisions (e.g., scores for the boosted code 153$x$) on the documents 107$x$ of the new corpus 109$x$ substantially immediately, even sometimes in the absence of any human input or coding input with respect to documents of the new corpus 109$x$. This allows "knowledge" gained from other corpora 109$a$, 109$b$ of documents to be bundled together and applied to a completely new set of documents 109x through ML model 103x1, even in the absence of any coding or human input with respect to those new documents. In this manner, these boosted codes 153x serve as classifiers that exist above the corpus level and can be re-purposed or reused across corpora 109 of documents 107 in a document analysis system 101.

Specifically, when a code 153 (e.g., boosted code 153x) is created and associated with a target corpus 109, there is no associated training dataset of that corpus 109 associated with that tag 153, and hence no native ML model for the tag 153. In other words, no coding decisions or decisions have been received in association with that code 153 for documents 107 of the target corpus 109 and thus no positive or negative signals to constitute a native dataset (e.g., signals associated with documents 107 of the target corpus 109) for that code 153. However, if the code 153x is boosted with a other codes 153a, 153b such that a boosting dataset 155 for that code 153x may be created, where that boosting dataset 155 comprises the datasets 155 of those boosting codes 153a, 153b before a native model is created for the code 153x, such a boosting ML model 103x1 may be used to generate predictive scores for that code 153x and corpus 109x that are shown to a user, potentially before the user has ever applied a single code to any of the documents 107x of the target corpus 109x. This provides substantial value to a user, who gains the benefit of machine-generated insights without the effort of labeling a dataset. In addition, embodiments may provide accelerated pathways for applying predictive scores to documents that allow these predictive scores to be shown to the user at a much faster rate than they would normally propagate through typical predictive coding systems.

Moreover, as an additional advantage, the boosting ML model 103x1 may be utilized even when the data (e.g., the corpus of documents) associated with a particular boosting tag 153a, 153b is unavailable for use with that model. Furthermore, the boosting ML model 103x1 may continue to evolve (e.g., be trained and tested) in the absence of such data. This capability is advantageous in a number of contexts where data (e.g., corpora 109 or documents 107 thereof) may have a limited time of access or lifetime, or ownership issues exist with respect to the data, such as in the legal context. For example, corpus 109a may be removed from the repository 105 of the document analysis system 101. However, the boosting ML model 103x1 may include (and still utilize and apply) the knowledge gained from documents 107a of that corpus 109a, even in the absence of the corpus 109a.

To illustrate in more detail, a particular point of differentiation between data warehousing in the legal industry as opposed to data warehousing across industries in general is that in the legal industry control over and availability of data are ephemeral. The data belongs to clients and not the legal firms or the third party services with which they share that data. This addition and removal of data presents a management challenge for maintaining the consistency and reliability of the bundles, which continue to be used even as the constituent codes change.

Consequently, codes 153 within an aggregation context (e.g., a legal firm) and the associated data (e.g., the documents 107 or corpora 109) may come and go. Permission to access the documents in a dataset underlying a boosting code may be withdrawn, or the documents 107 or corpora 109 may be removed from the system 101. According to embodiments therefore, a boosted tag (and the associated boosting ML model) exists separately from the boosting codes that are bundled to form it; new codes and their target corpora or datasets may be added while old codes and their target corpora or datasets may be removed.

Figures 1, 1C:
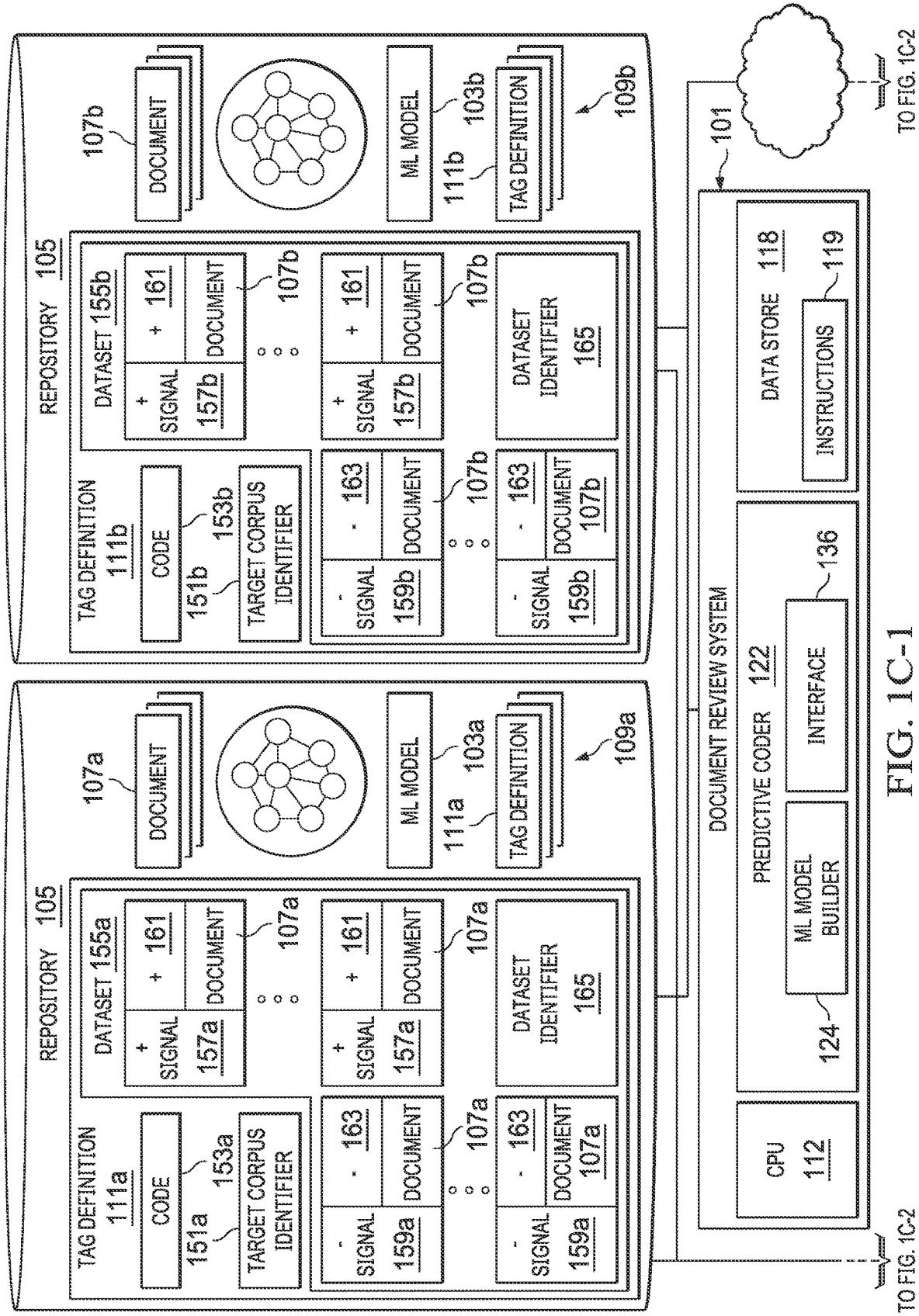
Figures 1, 1C, 2:
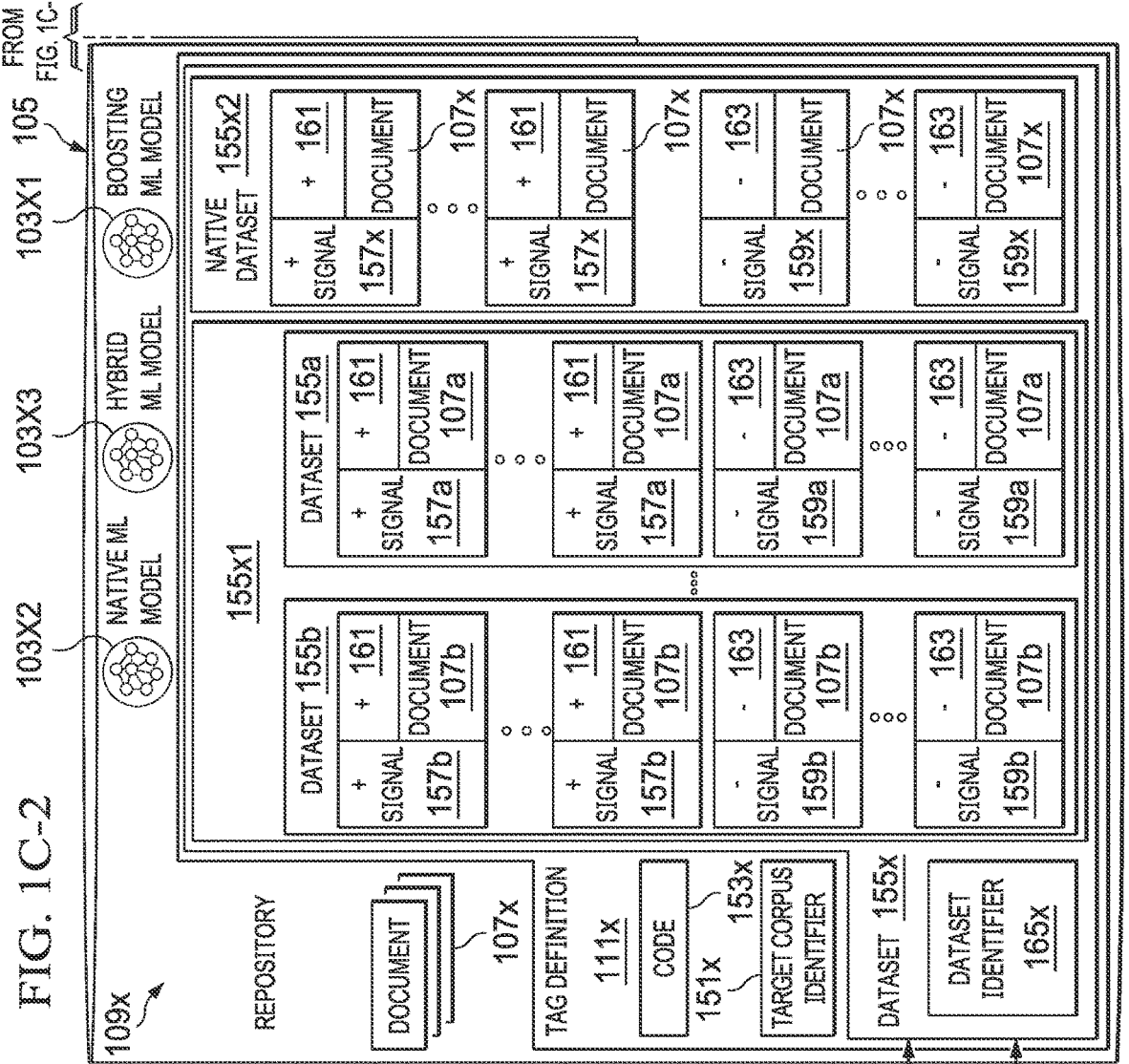

Referring now to FIG. 1C (again where clients 130 have been removed from the diagram for ease of depiction), as the documents 107 of a target corpus 109x are coded with respect to the boosted code 153x, or other input is received with respect to the boosted code 153x, a native dataset 155x2 comprising documents 107x of the target corpus 109x that have been coded with respect to the boosted code 153x may be determined. Thus, the dataset 155x for the boosted code 1053x may now include a boosting dataset 155x1 and a native dataset 155x2. Boosting dataset 155x1 comprises dataset 155a (positive signals 157a and negative signals 159a) associated with code 153a and dataset 155b (positive signals 157b and negative signals 159b) associated with code 153b, while native dataset 155x2 comprises positive signals 157x and negative signals 159x, each of these signals 157x and 159x including a document 107x (or reference to a document 107x) of the target corpus 109x and a corresponding annotation 161, 163.

Therefore, in some embodiments, ML model builder 124 may train multiple ML models 103 using the dataset 155x associated with the boosted tag 153x using different subsets or permutations of the datasets 155 comprising the dataset 155x associated with that code 153x. In one embodiment, for example, the ML model builder 124 may train a boosting ML model 103x1 in a boosting training process, a native ML model 103x2 in a native training process and a hybrid ML model 103x3 in a hybrid training process. Alternatively, in another embodiment, a native ML model 103x2 may be trained in a native training process and either the boosting ML model 103x1 may be trained in the boosting training process or the hybrid ML model 103x3 may be trained in the hybrid training process.

In certain embodiments, each code 153x that is activated for machine learning (e.g., by the user who defined the code) is associated with a series of training processes (e.g., that may be turned on or off by the user with respect to the code). The associated training processes for the code may be initiated after an incrementally growing number of tagging decisions (e.g., by a human coder) in order to generate models in that training process that account for the increasing amount of signal emanating from the review.

Again, the boosting training process may train the boosting ML model 103x1 based on boosting dataset 155x1 comprising datasets 155a and 155b including signals 157a, 157b, 159a, 159b from boosting tags 153a, 153b associated with documents 107a 107b of corpora 109a and 109b the dataset 155x of the tag definition 111x for the code 153x.

The native training process may train native ML model 103x2 based on native dataset 155x2 comprising positive signals 157x and negative signals 159x, each associated with a document 107x of the target corpus 109x. The hybrid training process employed by ML model builder 124 may train a hybrid ML model 103x3 based on both the boosting dataset 155x1 and the native dataset 155x2. In other words, the boosting dataset 155x1 and the native dataset 155x2 may be composted to form a hybrid dataset and this hybrid dataset used to train the hybrid ML model 103x3. The generation of each of the boosting ML model 103x1, native ML model 103x2 and hybrid ML model 103x3 may be trained in a similar manner to that described above.

Thus, hybrid ML model 103x3 is informed by coding decisions (e.g., signals) with respect to corpus 109a and code 153a, corpus 107b and code 153b, and coding decision with respect to corpus 109x and code 153x. Native ML model 103x2 is informed by coding decisions (e.g., signals)

with respect to documents 107*x* of corpus 109*x*, while boosting ML model 103*x*1 is informed by coding decisions (e.g., signals) with respect to corpus 109*a* and code 153*a* and corpus 107*b* and code 153*b*.

As can be seen then, at this point there may be multiple ML models 103*x* (e.g., native model 103*x*2, boosting ML model 103*x*1, or hybrid ML model 133*x*3) that may be used to generate predictive scores for code 153*x* with respect to the documents 107*x* of the corpus 109*x*. As it is desired to generate the most accurate predictive score possible, predictive coder 122 may perform A/B testing on any available models 103 for a code 153 to select the best model to use for generating predictive codes for the documents 107*x* of the corpus 109*x* with respect to the boosted code 153*x*. This testing may occur, for example, at the time the documents of the corpus 107*x* are scored with respect to the code 153*x* (e.g., for presentation to the user). Thus, each code 153 may have its own tests performed to see which of the available models 103 for that tag 153 is best for that particular tag 153. For example, with respect to code 153*x*, predictive coder 122 may test hybrid ML model 103*x*3, native ML model 103*x*2 and boosted ML model 103*x*1 to evaluate these models against one another to select a best one of the models to utilize.

The predictive coder 122 may test each of these models 103*x* using a test set of data derived from corpus 107*x* (e.g., a "native test set") to obtain an accuracy metric for each model 103*x* such that the model with the highest accuracy may be selected to generate predictive codes for the code 153*x* for display to the user. In particular, each of the hybrid ML model 103*x*3, native ML model 103*x*2 and boosting ML model 103*x*1 may be tested on the test set for the corpus 107*x*. The model 103 (e.g., hybrid ML model 103*x*3, native ML model 103*x*2 or boosting ML model 103*x*1) that is selected based on the evaluation, may be used to generate predictive scores for the documents of the corpus 109*x* that are shown to the users. In this way, the user always obtains the best predictive scores that can be obtained using the models generated by the multiple training processes.

In one embodiment, in order to maintain consistency, the models 103 produced by each training process (e.g., the boosting training process, the hybrid training process or the native training process) for a boosted code 153*x* may be archived, or the selected best model used to generate scores may be archived. When the test set changes, the training set also changes and a training process will be initiated. A set of models including at least the best of the previous models and the outcome of the most recent training processes (e.g., hybrid ML model 103*x*3, native ML model 103*x*2 and boosting ML model 103*x*1) are evaluated on the new test set. Here, the model 103 (e.g., hybrid ML model 103*x*3, native ML model 103*x*2 and boosting ML model 103*x*1 or a previous model 103) that is selected based on the evaluation, may be used to generate predictive scores for the documents of the corpus 109*x* that are shown to the users. In this way, the user always obtains the best predictive scores that can be offered by either a current training process or a previous training process.

These previously trained models may have been trained on data that is no longer available (e.g., the corpus on which it was initially developed may no longer available). By archiving and testing previously generated models a model trained on the old data may be still available, and if this model has better performance on the new test set, this previously trained model may be used to generate predictive scores for the code 153*x*. Thus embodiments may allow the retention of quality models in an environment of changing data.

Specifically, in embodiments the predictive coder 122 may determine and track metrics regarding the performance of the predictive coder 122 within each corpus 109 and across corpora 109 and makes these metrics available for display to a user in order to guide decisions on which codes should be bundled together or where codes may be boosted (or used to boost another code) to augment existing predictions. Accuracy metrics include but are not limited to precision, recall, F1-score, raw accuracy, weighted accuracy, perceived accuracy, enrichment, etc.

Such an accuracy metric may be determined for each existing model associated with a code 153 (e.g., code 153*x*) to determine the best model to utilize to generate predictive scores for documents of corpus 109 with respect to the code 153. The selection of the accuracy may be of particular importance in the context of boosted tags according to embodiments. To explain in more detail, within information retrieval, it is commonly the case that one wishes to locate some small fraction of items within a much larger corpus. As a consequence, if a decision process is measured according to how well it makes decisions generally about which items should be located, then one high accuracy decision process is simply to locate nothing. If 1% of the documents are relevant, then this nothing-locator yields 99% accuracy. As a consequence, within information retrieval, the metrics of precision and recall are used to measure, respectively, how accurate decisions are for proposed items and what percentage of actual items have been located; the F-score is the harmonic mean of these two metrics.

In the current context of embodiments including boosted codes, however, precision and recall no longer have the same meaning, because a bundled dataset for a boosted code is extracted from its natural context and corpus, and the basic statistics governing an information retrieval task are disrupted. Consequently, in order to measure the quality of decision processes over bundled datasets for boosted codes 153, a metric is needed that remains insensitive to the rarity of a class. The weighted accuracy is the average of the precision for the class and the precision for the negated class on the bundled dataset. This metric balances the prevalence of positive and negative identification of relevant objects, and hence can be used across multiple datasets to assess quality.

As such, in certain embodiments, predictive coder 122 may test each of the models (e.g., hybrid ML model 103*x*3, native ML model 103*x*2 and boosting ML model 103*x*1) using a test set of data derived from corpus 107*x* (e.g., a "native test set") to obtain an weighted accuracy for each model such that the model with the highest weighted accuracy may be selected to generate predictive codes for the code 153*x* for display to the user.

It will be noted here that the selected model 103*x* (or any of the models generated through the training processes described) for generating scores for predictive codes for code 153*x* can be applied not just to the target corpus 109*x* of documents 107, but additionally can be applied against any other corpora 109 of the document analysis system 101, including corpora 109 (e.g., corpus 109*a* or 109*b*) from which the boosting codes 153 (e.g., code 153*a* or 153*b*) were originally obtained or associated with. Thus, if code 153*x* is applied to an available corpora 109 (e.g., corpora 109*a* or 109*b*) in the future, the same process as described with respect to the training and selection of that model 103*x* with respect to corpus 109*x* may occur. As may be realized, in such a case, the documents 107 selected for a test set of documents for the model 103x as applied to that corpora 109 may be selected from that corpora 109. For example, if the selected model 103x is to be applied to corpus 109a, the test set of documents 107 for testing the models 103x generated by each training process may be selected from that particular corpus 109a to determine a best model for generating predictive scores for code 153x with respect to that corpus 109a. Thus, for example, the set of trained models 103x associated with a tag 153x may be evaluated using documents 107a and a best model 103x selected for generating predictive scores for code 153x with respect to that corpus 109a and the set of trained models 103x associated with a tag 153x may be evaluated using documents 107x and a best model 103x selected for generating predictive scores for code 153x with respect to that corpus 109x. Accordingly, in some instances, the selected models 103x for different corpora 109 may be different models 109x (e.g., produced by different training processes). In this manner, a best model 103x for generating predictive scores may be selected for a combination of a code 153x and the particular corpus 109 to which it is to be applied. Accordingly, these composite or boosted tags may be reused and serve as classifiers that may be reused across corpora of documents in a document analysis system.

Moreover, in those instances, when coding decisions are made with respect to that code 153x and documents 107 of a particular corpus 109 that is not the (e.g., original) target corpus 109x of the code 153x, those coding decisions may be added to the dataset 155x associated with the code 153x. Specifically, the coding decisions with respect to the code 153x and a particular 107 associated with a particular corpus 109 may be added as signal to the portion of the dataset 155x of the code 153x comprising documents 107 of that corpus 109a. Thus, for example, if a coding decision for tag 153x is received with respect to a document 107a from corpus 107a, it may be added to boosting dataset 155x1 in association with signals 157a, 159a associated with that corpus 109a.

It may now be useful for an understanding of embodiments to discuss an embodiment of a method that may be employed by document analysis systems for reuse of data, models or coding decisions developed with respect to one corpus in the coding of another corpus. FIG. 2 depicts one embodiment of just such a methodology. With reference to the flow diagram of FIG. 2, initially then, a definition of a code and a target corpus may be received by the document analysis system (STEP 202). This definition may, for example, include the associated code (e.g., label) and one or more target corpora against which are to be predictively coded according to the code. Once the code is defined, this code may be boosted by selecting one or more boosting codes for the defined code (the boosted code) that are received by the document analysis system (STEP 204). The definition of the boosted code and the selection of the one or more boosting codes may be done using an interface at the document analysis system by one or more different types of users.

For example, the types of users may include a curator (e.g., a curator persona) or a reviewer (e.g., a reviewer persona). Certain embodiments of the interface may allow a user, such as a curator or a creator of a code, to add a text annotation or other description (e.g., a natural language description or textual blurb) for the code being defined that may explain the code, its relevance or history, or any other information the user wishes to explicate regarding the code. The interface for a curator persona (e.g., a user who is a curator) may provide a list of available codes, their general statistics including the number of positive and negative signals (e.g., from a particular corpus 109) for the code, the textual descriptions for each code, if available, or an accuracy metric that can be used to judge the quality of the code and its relevance. The curator can then create new codes (e.g., boosted codes) from one or more extant codes and manage existing boosted codes by adding or removing codes (e.g. boosting codes) from this boosted code. The curator can also be provided with alerts when codes are selected to boost a code or when the document review system detects a potential match for a boosted code. These features make it easy to reuse existing datasets by selecting appropriate codes for boosting.

A reviewer interface may also be provided for a reviewer or review manager. These review managers may be people who (e.g., during legal discovery or the like) may be responsible for organizing and supervising the review process whose outcome is the application of a set of codes to a corpus. The review manager may make or implement decisions about whether and how to utilize machine predictions during the review process. Accordingly, embodiments of interfaces may offer a code management panel on which a review manager (or other user) can view and edit the codes for the review process. In particular, the review manager can add or modify the text description and can determine whether or not machine learning will be applied to a particular code. During the process of this latter decision, the review manager (or a curator) may be provided the opportunity to "boost" a code based with another currently existing code. This interface may also indicate which of these codes are themselves boosted codes and the composition of the datasets of such codes (e.g., the corpora with which they are associated). This list can be searched, sorted, or filtered in order to help the review manager find the most relevant code or codes.

Once the boosting codes are selected for the boosted code, the datasets (e.g., the positive and negative signals) associated with each of the boosting codes can be added to the dataset of the boosted code as a boosting dataset of the boosted code (STEP 206). Once the boosted code is defined and the boosting codes associated such that the boosting dataset of the boosted code has been created (or updated), at some time interval then, a determination may be made by the document analysis system to train models for the boosted code (STEP 208). This determination may be made on a criterion such as a size of datasets of one or more of the boosting codes, the size of the boosting dataset of the boosted code, a change in a training, testing or evaluation dataset, an elapsed time interval, or almost any criteria desired.

When it is determined that models are to be trained (Y Branch of STEP 208), the document analysis system can then determine whether a boosting model, a hybrid model or a native model is to be trained (e.g., using an associated training process) (STEP 210). This determination can be made based on a setting of user who defined the boosted code or a user who boosted the code by selecting the boosting tags, such a reviewer or a curator; based on data availability such as the size of the boosting dataset or a native dataset; based on hard coded settings or administrator configurable settings of the document analysis system, or based on some other criterion.

In one embodiment, either a hybrid or a boosting model may be trained by the document analysis system (STEP 212), while a native model may always be trained if a size of a native dataset exceeds a certain threshold number of positive or negative signals (STEP 214). If a boosting model is to be created (Boosting Branch of STEP 212), the document analysis system may train a boosting model in a boosting training process by training a model using only the boosting dataset of the boosted code (e.g., the dataset formed of positive and negative signals obtained from the datasets of each of the boosting codes selected for the boosted code) to yield the boosting model (STEP 216). If a hybrid model is to be created (Hybrid Branch of STEP 212), the document analysis system may train a hybrid model in a hybrid training process by training a model using the boosting dataset of the boosted code (e.g., the dataset formed of positive and negative signals obtained from the datasets of each of the boosting codes selected for the boosted code) and the native data set (e.g., the dataset formed of positive and negative signals associated with documents of the target corpus coded according to the boosted code) to yield the hybrid model (STEP 218). If a native model is to be created (e.g., if there is a sufficient native dataset) (Y Branch of STEP 214) the document analysis system may train a native model in a native training process by training a model using only the native dataset of the boosted code (e.g., the dataset formed of positive and negative signals associated with documents of the target corpus coded according to the boosted code) (STEP 220).

These models may be generated in a similar manner to that described in U.S. patent application Ser. No. 16/167,205 entitled "Methods and Apparatus for Asynchronous and Interactive Machine Learning Using Attention Selection Techniques" by Lockett, however, it will also be noted generally that in various embodiments ML models may be generated by different methodology, or that ML models generated from different datasets (or the same datasets) may be generated by differing methodologies, without loss of generality, In one embodiment, in order to ensure that a boosting or hybrid ML model is not overly influenced (e.g., over-weighed) by a particular boosting code, a boosting or hybrid model may be trained using a balancing methodology to sample positive signals and negative signals from each composite dataset of the boosting dataset associated with each boosting code (or native data set) according to a balancing methodology. This balancing methodology may include for example, a logarithmic differential balancing method, a round robin selection process whereby a positive and negative signal is selected from each of the composite dataset, or by some other balancing method.

Thus, at the end of the model training process there are a set of current models trained for the boosted code. If there are multiple models, these trained models may be evaluated against one another to select the current best model (STEP 222). Specifically, in one embodiment, A/B testing on any available models (e.g., if more than one has been trained) may be performed to select the best of these currently trained models. These models may be tested using a test set of data derived from the target corpus to obtain an accuracy metric for each model such that the model (e.g., boosting, hybrid or native) with the highest accuracy may be selected.

Once a current best model of the trained models has been selected it can be determined if there are any previously trained best models (STEP 224). If a previously generated best model exists (e.g., a model has been previously trained for the boosted code and used to generate predictive scores for the boosted code) (Y Branch of STEP 224), the best of the currently trained models may be evaluated against the previous best model (e.g., using A/B testing based on the test set of data of the target corpus). The best of the currently trained model or the previous best model may then be selected as the current best model (STEP 226) and applied to the target corpus to generate scores for the boosted code (STEP 228). In this way, the user always obtains the best predictive scores that can be offered by either a current training process or a previous training process. The predictive coding scores for the documents and the boosted code can be presented to the user through an interface of the document analysis system. Other information can also be displayed to a user of the system through such an interface, such as a display of a history of accuracy or quality of models or training process (e.g., on a particular corpus) to lend confidence to the determinations of the document analysis system. Coding decisions with respect to the documents of the target corpus and the boosted code can be received (e.g., through the interface) (STEP 230) and added to the native dataset associated with the boosted code (STEP 232).

Embodiments as described herein may be understood with reference to embodiments of interfaces such embodiments. FIGS. 3A-3C depict embodiments of a reviewer interface for use with a document analysis system. In the depicted example interfaces, in FIG. 3A, the user has defined a code (e.g., referred to in the interface as a "tag") called "Bribes" and assigned it a textual description of "Docs about illegal persuasion". In FIG. 3B, a user is presented with a list of codes that may be used to boost the "Bribes" code being defined, along with the textual descriptions of such potential boosting codes. Here, the user has selected another "Bribes" code as a boosting code for the "Bribes" code being defined. In FIG. 3C, the "Bribes" code being defined is now shown as being boosted by the "Bribes" code and the "AI Predictions" slider is set to "on", denoting that the "Bribes" code being defined will be boosted using the selected "Bribes" boosting code and that predictive codes will be generated based on a boosting dataset derived from this boosting code.

FIGS. 4A-4C depict embodiments of a curator interface for a document analysis system. As can be seen in FIG. 4A, a user (e.g., a curator) can be presented with a list of boosted codes for which predictive coding is enabled where at least one boosting code for each of the boosted code having a different target corpus (e.g., referred to as "cross-matter"). A text description may encompass each of the codes listed in the interface. Here, a "Bribes" code is listed as a cross-matter boosted code. FIG. 4B depicts an interface that may be displayed to the user when the user interacts with a boosted code, allowing a user to see all the boosting codes utilized by that boosted code, or alternatively, the other codes being boosted by that boosted code (e.g., where that boosted code is itself, used as a boosting code). FIG. 4C depicts an interface that allows code to be selected for removal or addition to the boosting codes utilized by that boosted code, or alternatively, the other codes being boosted by that boosted code.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:
1. A system for document analysis comprising:
a processor;
a data store, comprising a first corpus of electronic documents and a second corpus of electronic documents; and
a non-transitory computer readable medium comprising instructions for:
receiving an indication that a first code is to be boosted with a second code, wherein the first code is associated with first documents from the first corpus and the second code is associated with a boosting dataset comprising positive signals or negative signals from the second corpus, each positive or negative signal associated with second documents of the second corpus, wherein each positive signal indicates an associated second document of the second corpus belongs to the second code and each negative signal indicates the associated second document of the second corpus does not belong to the second code; and
training a boosting machine learning model adapted to:
generate a probability score for each document of the first corpus, wherein the probability score indicates a likelihood that the document belongs to the first code, based on the boosting dataset including the boosting dataset comprising positive signals or negative signals from the second corpus, including training the boosting machine learning model based on each positive signal or negative signal from the second corpus, such that the boosting machine learning model is trained to generate predictive scores for the first code based on the positive or negative signals from the second corpus associated with the second documents of the second corpus associated with the boosting dataset, wherein the training of the boosting machine learning model further comprises balancing the boosting machine learning model by:
dividing the boosting dataset into a first group comprising the positive signals and a second group comprising the negative signals;
alternately selecting a positive signal from the first group and a negative signal from the second group to form pairs for the training of the boosting machine learning model, until all instances of signals in the first group or the second group have been selected; and when either the positive or negative group has remaining instances after all instances in the other group have been selected, selecting the remaining instances from the other group until all instances have been selected; and displaying the probability score to a user.

2. The system of claim 1, wherein the instructions are further for:

comparing the boosting machine learning model to a previous boosting machine leaning model for the first code previously trained on a previous boosting dataset comprising positive signals or negative signals from the second corpus; and selecting, based on the comparison, the better of the boosting learning model or the previous boosting machine learning model as a current boosting machine learning model.

3. The system of claim 2, wherein the instructions are further for:

training, on a native dataset, a native machine learning model adapted to generate predictive scores for the first code;

comparing the native machine learning model to the current boosting machine learning model; and selecting, based on the comparison, the better of the first machine learning model or the second machine learning model to generate predictive scores for the first code.

4. The system of claim 1, wherein the indication is received through an interface through which a user defines the first code.

5. The system of claim 4, wherein the interface allows the user to search for codes utilized for different corpora of documents and the second code is selected for boosting the first code using the interface.

6. The system of claim 5, wherein the user does not have access to the second corpus of documents.

7. The system of claim 1, wherein the first target corpus is different than the second target corpus.

8. A method for document analysis comprising:

receiving an indication that a first code is to be boosted with a second code, wherein the first code is associated with first documents from a first corpus and the second code is associated with a boosting dataset comprising positive signals or negative signals from a second corpus, each positive or negative signal associated with second documents of the second corpus, wherein each positive signal indicates an associated second document of the second corpus belongs to the second code and each negative signal indicates the associated second document of the second corpus does not belong to the second code; and training a boosting machine learning model adapted to:

generate a probability score for each document of the first corpus, wherein the probability score indicates a likelihood that the document belongs to the first code, based on the boosting dataset including the boosting dataset comprising positive signals or negative signals from the second corpus, including training the boosting machine learning model based on each positive signal or negative signal from the second corpus, such that the boosting machine learning model is trained to generate predictive scores for the first code based on the positive or negative signals from the second corpus associated with the second documents of the second corpus associated with the boosting dataset, wherein the training of the boosting machine learning model further comprises balancing the boosting machine learning model by:

dividing the boosting dataset into a first group comprising the positive signals and a second group comprising the negative signals;

alternately selecting a positive signal from the first group and a negative signal from the second group to form pairs for the training of the boosting machine learning model, until all instances of signals in the first group or the second group have been selected; and when either the positive or negative group has remaining instances after all instances in the other group have been selected, selecting the remaining instances from the other group until all instances have been selected; and displaying the probability score to a user.

9. The method of claim 8, further comprising:

comparing the boosting machine learning model to a previous boosting machine leaning model for the first code previously trained on a previous boosting dataset comprising positive signals or negative signals from the second corpus; and selecting, based on the comparison, the better of the boosting learning model or the previous boosting machine learning model as a current boosting machine learning model.

10. The method of claim 9, further comprising:

training, on a native dataset, a native machine learning model adapted to generate predictive scores for the first code;

comparing the native machine learning model to the current boosting machine learning model; and selecting, based on the comparison, the better of the first machine learning model or the second machine learning model to generate predictive scores for the first code.

11. The method of claim 8, wherein the indication is received through an interface through which a user defines the first code.

12. The method of claim 11, wherein the interface allows the user to search for codes utilized for different corpora of documents and the second code is selected for boosting the first code using the interface.

13. The method of claim 12, wherein the user does not have access to the second corpus of documents.

14. The method of claim 8, wherein the first target corpus is different than the second target corpus.

15. A non-transitory computer readable medium, comprising instructions for:

receiving an indication that a first code is to be boosted with a second code, wherein the first code is associated with first documents from a first corpus and the second code is associated with a boosting dataset comprising positive signals or negative signals from a second corpus, each positive or negative signal associated with second documents of the second corpus, wherein each positive signal indicates an associated second document of the second corpus belongs to the second code and each negative signal indicates the associated second document of the second corpus does not belong to the second code; and training a boosting machine learning model adapted to:

generate a probability score for each document of the first corpus, wherein the probability score indicates a likelihood that the document belongs to the first code, based on the boosting dataset including the boosting dataset comprising positive signals or negative signals from the second corpus, including training the boosting machine learning model based on each positive signal or negative signal from the second corpus, such that the boosting machine learning model is trained to generate predictive scores for the first code based on the positive or negative signals from the second corpus associated with the second documents of the second corpus associated with the boosting dataset, wherein the training of the boosting machine learning model further comprises balancing the boosting machine learning model by:
dividing the boosting dataset into a first group comprising the positive signals and a second group comprising the negative signals;
alternately selecting a positive signal from the first group and a negative signal from the second group to form pairs for the training of the boosting machine learning model, until all instances of signals in the first group or the second group have been selected; and
when either the positive or negative group has remaining instances after all instances in the other group have been selected, selecting the remaining instances from the other group until all instances have been selected; and
displaying the probability score to a user.

16. The non-transitorey computer readable medium of claim 8, further comprising instructions for: comparing the boosting machine learning model to a previous boosting machine leaning model for the first code previously trained on a previous boosting dataset comprising positive signals or negative signals from the second corpus; and selecting, based on the comparison, the better of the boosting learning model or the previous boosting machine learning model as a current boosting machine learning model.

17. The non-transitory computer readable medium of claim 16, further comprising instructions for:
training, on a native dataset, a native machine learning model adapted to generate predictive scores for the first code;
comparing the native machine learning model to the current boosting machine learning model; and
selecting, based on the comparison, the better of the first machine learning model or the second machine learning model to generate predictive scores for the first code.

18. The non-transitory computer readable medium of claim 15, wherein the indication is received through an interface through which a user defines the first code.

19. The non-transitory computer readable medium of claim 18, wherein the interface allows the user to search for codes utilized for different corpora of documents and the second code is selected for boosting the first code using the interface.

20. The non-transitory computer readable medium of claim 19, wherein the user does not have access to the second corpus of documents.

21. The non-transitory computer readable medium of claim 15, wherein the first target corpus is different than the second target corpus.

* * * * *

UNITED STATES PATENT AND TRADEMARK OFFICE
CERTIFICATE OF CORRECTION

PATENT NO. : 12,437,240 B2  
APPLICATION NO. : 17/859886  
DATED : October 7, 2025  
INVENTOR(S) : Alan Justin Lockett et al.

Page 1 of 1

It is certified that error appears in the above-identified patent and that said Letters Patent is hereby corrected as shown below:

In the Claims

Column 33, at Line 28, replace "non-transitorey" with --non-transitory--.

Column 33, at Line 31, replace "leaning" with --learning--.

Signed and Sealed this  
Twentieth Day of January, 2026

John A. Squires  
*Director of the United States Patent and Trademark Office*